US012676658B2

(12) United States Patent
Li et al.

(10) Patent No.: US 12,676,658 B2
(45) Date of Patent: Jul. 7, 2026

(54) NR AIR-TO-GROUND SIGNALING ENHANCEMENT TO SUPPORT MULTIPLE NUMEROLOGIES

(71) Applicant: QUALCOMM Incorporated, San Diego, CA (US)

(72) Inventors: Qiaoyu Li, Beijing (CN); Yu Zhang, San Diego, CA (US); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 18/547,805

(22) PCT Filed: May 24, 2021

(86) PCT No.: PCT/CN2021/095403
§ 371 (c)(1),
(2) Date: Aug. 24, 2023

(87) PCT Pub. No.: WO2022/246587
PCT Pub. Date: Dec. 1, 2022

(65) Prior Publication Data
US 2024/0137088 A1    Apr. 25, 2024
US 2024/0235640 A9    Jul. 11, 2024

(51) Int. Cl.
*H04B 7/06*      (2006.01)
*H04B 17/336*    (2015.01)
*H04L 27/26*     (2006.01)

(52) U.S. Cl.
CPC ......... *H04B 7/0626* (2013.01); *H04B 17/336* (2015.01); *H04L 27/26025* (2021.01); *H04L 27/2605* (2013.01)

(58) Field of Classification Search
CPC ................ H04B 1/0626; H04B 17/336; H04L 27/26025; H04L 27/2605
See application file for complete search history.

(56) References Cited

U.S. PATENT DOCUMENTS

2018/0279149 A1    9/2018  Li et al.
2019/0058517 A1    2/2019  Kang et al.
(Continued)

FOREIGN PATENT DOCUMENTS

CN        110999443 A       4/2020
WO       2020198977 A1     10/2020
WO    WO-2021162859 A1 *   8/2021   ......... H04L 25/0254

OTHER PUBLICATIONS

Futurewei: "CSI Enhancement for Multi-TRP and FDD", 3GPP TSG RAN WG1 Meeting #104-e, R1-2100043, e- Meeting, Jan. 25, 2021-Feb. 5, 2021, 7 Pages, Feb. 5, 2021 (Feb. 5, 2021), sections 1-2.
(Continued)

*Primary Examiner* — Derrick V Rose
(74) *Attorney, Agent, or Firm* — Harrity & Harrity, LLP

(57)            ABSTRACT

Various aspects of the present disclosure generally relate to wireless communication. In some aspects, a user equipment (UE) may receive, from a base station, a channel state information (CSI) report configuration including configuration information that identifies a channel measurement resource associated with a first numerology and configuration information that identifies an interference measurement resource associated with a second numerology that is different from the first numerology. The UE may perform a channel measurement on the channel measurement resource associated with the first numerology and an interference measurement on the interference measurement resource associated with the second numerology. The UE may transmit, to the base station, a CSI report based at least in part on the channel measurement and the interference measurement. Numerous other aspects are described.

30 Claims, 12 Drawing Sheets

(56) References Cited

U.S. PATENT DOCUMENTS

| 2021/0167928 | A1* | 6/2021 | Xiao | ..................... | H04L 1/1896 |
| 2023/0056263 | A1* | 2/2023 | Kim | ..................... | H04B 7/0456 |
| 2023/0379739 | A1* | 11/2023 | Kim | ..................... | H04W 24/10 |

OTHER PUBLICATIONS

International Search Report and Written Opinion—PCT/CN2021/095403—ISA/EPO—Jan. 26, 2022.

\* cited by examiner

| Param/Numerology (u) | -1 | -1B | 0 | 1 | 1 (ECP) | 2 | 2 (ECP) | 2 (eECP) | 3 | 4 |
|---|---|---|---|---|---|---|---|---|---|---|
| SCS (KHz) | 7.5 | 7.5 | 15 | 30 | 30 | 60 | 60 | 60 | 120 | 240 |
| Sys-Duration (µs) | 133.3 | 133.3 | 66.67 | 33.33 | 16.67 | 16.67 | 16.67 | 16.67 | 8.33 | 4.17 |
| CP (µs) | 9.40 | 9.40 | 4.69 | 2.34 | 8.33 | 1.17 | 4.16 | 8.33 | 0.57 | 0.29 |
| Total-Sym-Duration (µs) | 142.7 | 142.7 | 71.35 | 35.68 | 41.67 | 17.84 | 20.83 | 25 | 8.92 | 4.46 |
| # OFDM syms per slot | 7 | 14 | 14 | 14 | 12 | 14 | 12 | 10 | 14 | 14 |

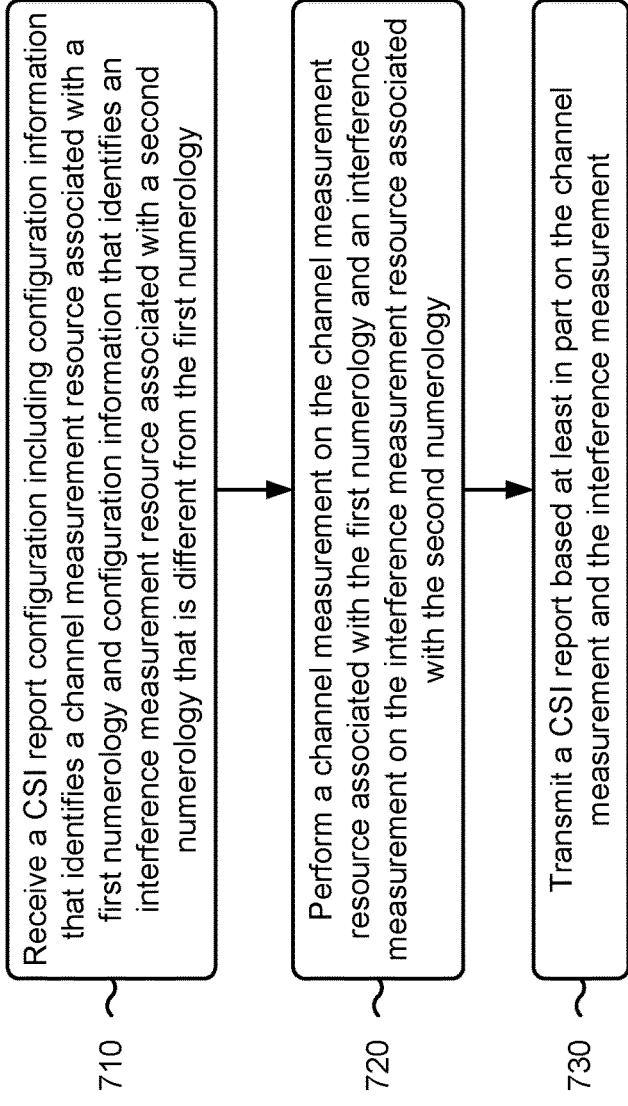

Receive a CSI report configuration including configuration information that identifies a channel measurement resource associated with a first numerology and configuration information that identifies an interference measurement resource associated with a second numerology that is different from the first numerology Perform a channel measurement on the channel measurement resource associated with the first numerology and an interference measurement on the interference measurement resource associated with the second numerology Transmit a CSI report based at least in part on the channel measurement and the interference measurement

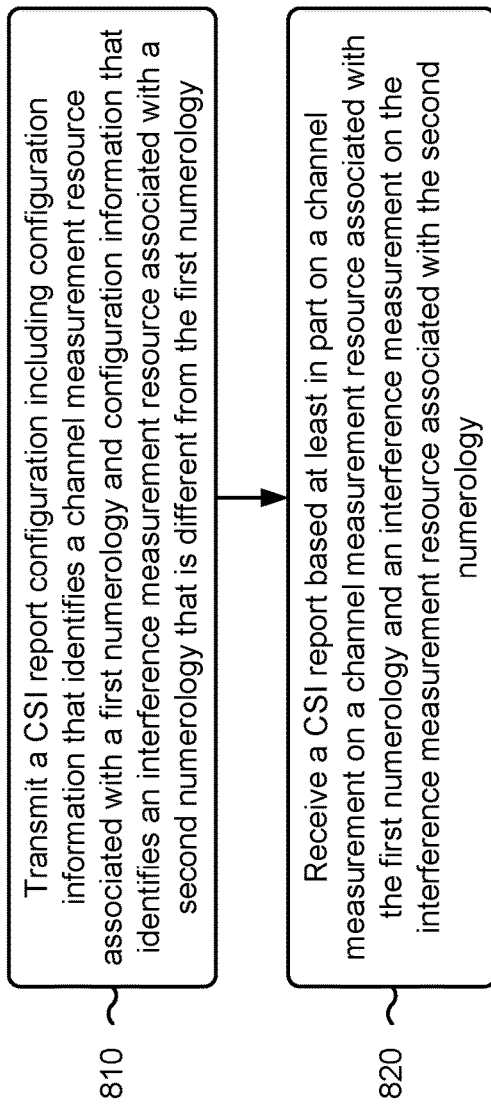

810 — Transmit a CSI report configuration including configuration information that identifies a channel measurement resource associated with a first numerology and configuration information that identifies an interference measurement resource associated with a second numerology that is different from the first numerology 820 — Receive a CSI report based at least in part on a channel measurement on a channel measurement resource associated with the first numerology and an interference measurement on the interference measurement resource associated with the second numerology

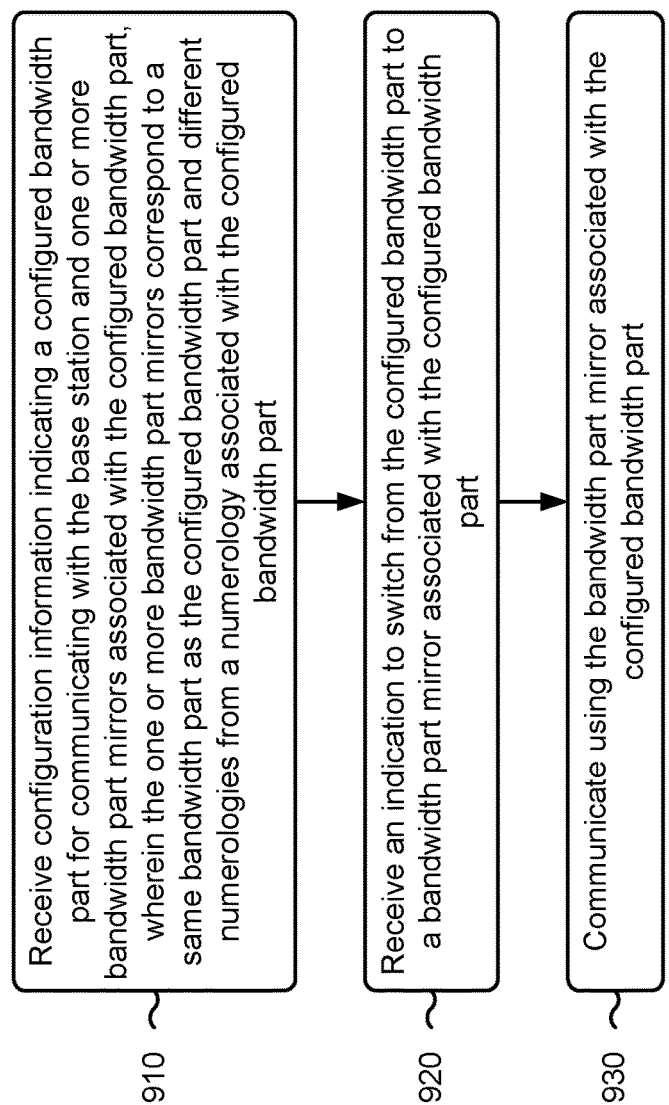

910  Receive configuration information indicating a configured bandwidth part for communicating with the base station and one or more bandwidth part mirrors associated with the configured bandwidth part, wherein the one or more bandwidth part mirrors correspond to a same bandwidth part as the configured bandwidth part and different numerologies from a numerology associated with the configured bandwidth part 920  Receive an indication to switch from the configured bandwidth part to a bandwidth part mirror associated with the configured bandwidth part 930  Communicate using the bandwidth part mirror associated with the configured bandwidth part

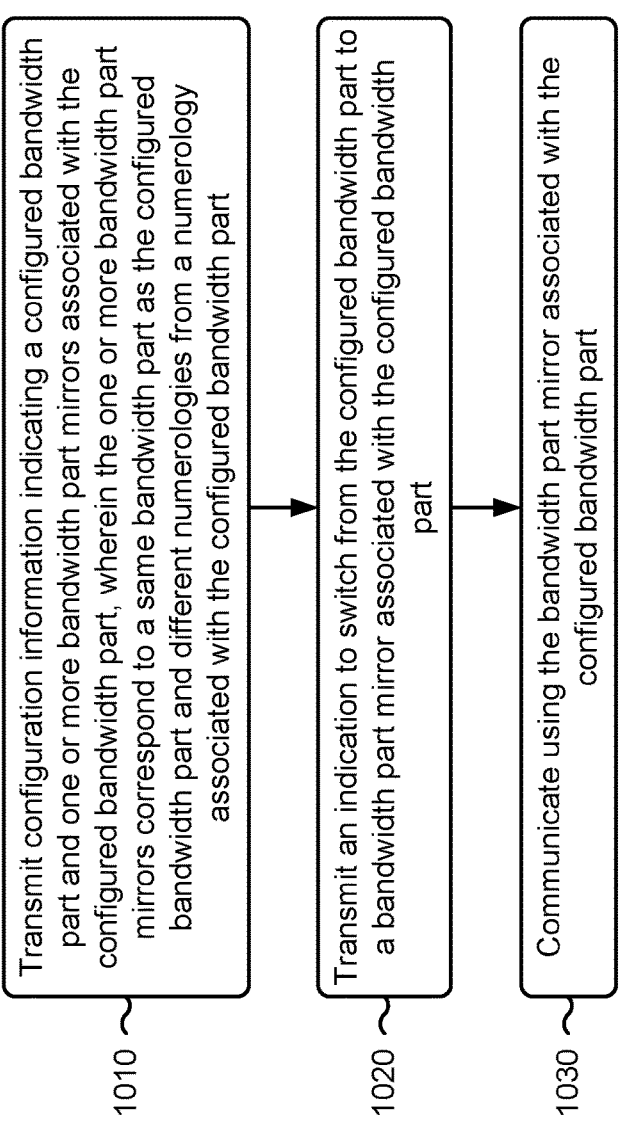

1010 Transmit configuration information indicating a configured bandwidth part and one or more bandwidth part mirrors associated with the configured bandwidth part, wherein the one or more bandwidth part mirrors correspond to a same bandwidth part as the configured bandwidth part and different numerologies from a numerology associated with the configured bandwidth part 1020 Transmit an indication to switch from the configured bandwidth part to a bandwidth part mirror associated with the configured bandwidth part 1030 Communicate using the bandwidth part mirror associated with the configured bandwidth part

NR AIR-TO-GROUND SIGNALING ENHANCEMENT TO SUPPORT MULTIPLE NUMEROLOGIES

CROSS-REFERENCE TO RELATED APPLICATION

This application is a 371 national stage of Patent Cooperation Treaty (PCT) Application No. PCT/CN2021/095403 filed on May 24, 2021, entitled "NR AIR-TO-GROUND SIGNALING ENHANCEMENT TO SUPPORT MULTIPLE NUMEROLOGIES," which is hereby expressly incorporated by reference herein.

FIELD OF THE DISCLOSURE

Aspects of the present disclosure generally relate to wireless communication and to techniques and apparatuses for air-to-ground (ATG) signaling enhancement to support multiple numerologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors, coupled to the memory, configured to: receive, from a base station, a channel state information (CSI) report configuration including configuration information that identifies a channel measurement resource associated with a first numerology and configuration information that identifies an interference measurement resource associated with a second numerology that is different from the first numerology; perform a channel measurement on the channel measurement resource associated with the first numerology and an interference measurement on the interference measurement resource associated with the second numerology; and transmit, to the base station, a CSI report based at least in part on the channel measurement and the interference measurement.

In some aspects, a base station for wireless communication includes a memory, and one or more processors, coupled to the memory, configured to: transmit, to a UE, a CSI report configuration including configuration information that identifies a channel measurement resource associated with a first numerology and configuration information that identifies an interference measurement resource associated with a second numerology that is different from the first numerology; and receive, from the UE, a CSI report based at least in part on a channel measurement on a channel measurement resource associated with the first numerology and an interference measurement on the interference measurement resource associated with the second numerology.

In some aspects, a method of wireless communication performed by a UE includes receiving, from a base station, a CSI report configuration including configuration information that identifies a channel measurement resource associated with a first numerology and configuration information that identifies an interference measurement resource associated with a second numerology that is different from the first numerology; performing a channel measurement on the channel measurement resource associated with the first numerology and an interference measurement on the interference measurement resource associated with the second numerology; and transmitting, to the base station, a CSI report based at least in part on the channel measurement and the interference measurement.

In some aspects, a method of wireless communication performed by a base station includes transmitting, to a UE, a CSI report configuration including configuration information that identifies a channel measurement resource associated with a first numerology and configuration information that identifies an interference measurement resource associated with a second numerology that is different from the first numerology; and receiving, from the UE, a CSI report based at least in part on a channel measurement on a channel measurement resource associated with the first numerology and an interference measurement on the interference measurement resource associated with the second numerology.

In some aspects, a non-transitory computer-readable medium storing a set of instructions for wireless communication includes one or more instructions that, when executed by one or more processors of a UE, cause the UE to: receive, from a base station, a CSI report configuration including configuration information that identifies a channel measurement resource associated with a first numerology and configuration information that identifies an interference measurement resource associated with a second numerology that is different from the first numerology; perform a channel measurement on the channel measurement resource associated with the first numerology and an interference measurement on the interference measurement resource associated with the second numerology; and transmit, to the base station, a CSI report based at least in part on the channel measurement and the interference measurement.

In some aspects, a non-transitory computer-readable medium storing a set of instructions for wireless communication includes one or more instructions that, when executed by one or more processors of a base station, cause the base station to: transmit, to a UE, a CSI report configuration including configuration information that identifies a channel measurement resource associated with a first numerology and configuration information that identifies an interference measurement resource associated with a second numerology that is different from the first numerology; and receive, from the UE, a CSI report based at least in part on a channel measurement on a channel measurement resource associated with the first numerology and an interference measurement on the interference measurement resource associated with the second numerology.

In some aspects, an apparatus for wireless communication includes means for receiving, from a base station, a CSI report configuration including configuration information that identifies a channel measurement resource associated with a first numerology and configuration information that identifies an interference measurement resource associated with a second numerology that is different from the first numerology; means for performing a channel measurement on the channel measurement resource associated with the first numerology and an interference measurement on the interference measurement resource associated with the second numerology; and means for transmitting, to the base station, a CSI report based at least in part on the channel measurement and the interference measurement.

In some aspects, an apparatus for wireless communication includes means for transmitting, to a UE, a CSI report configuration including configuration information that identifies a channel measurement resource associated with a first numerology and configuration information that identifies an interference measurement resource associated with a second numerology that is different from the first numerology; and means for receiving, from the UE, a CSI report based at least in part on a channel measurement on a channel measurement resource associated with the first numerology and an interference measurement on the interference measurement resource associated with the second numerology.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of numerologies for orthogonal frequency division multiplexing (OFDM) based communications, in accordance with the present disclosure.

FIGS. 7-8 are diagrams illustrating example processes associated with ATG signaling enhancement for cross-numerology interference measurements, in accordance with the present disclosure.

FIGS. 9-10 are diagrams illustrating example processes associated with ATG signaling enhancement to support multiple numerologies, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
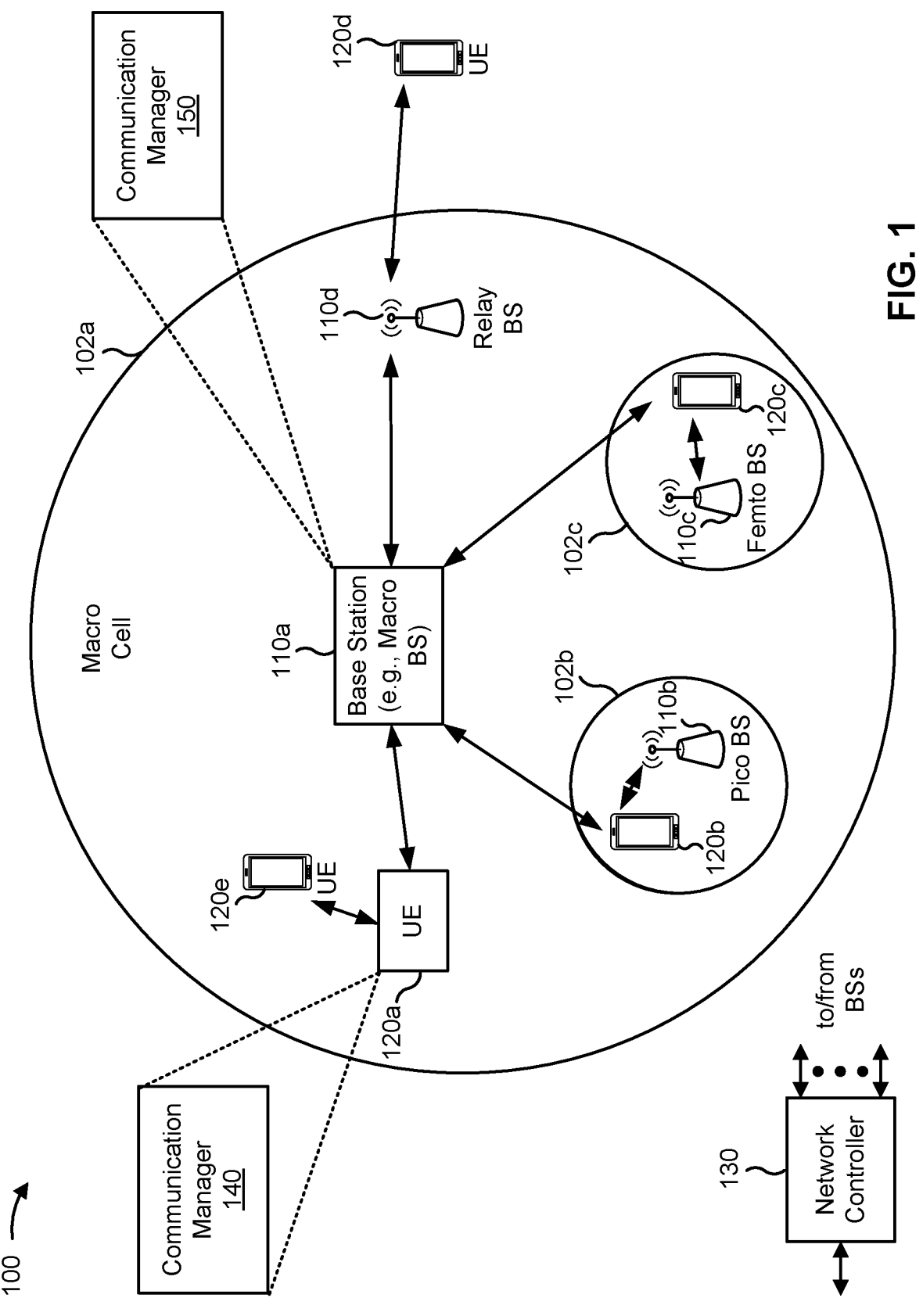
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, some UEs may be air-to-ground (ATG) UEs. An ATG UE is an onboard terminal on an aircraft that communicates with a ground-based ATG base station. Such an ATG UE may also be referred to as an "ATG terminal." In some aspects, an ATG UE may be considered a CPE for an aircraft and may provide network connectivity (e.g., via Wi-Fi or a small cell network) to other UEs on the aircraft, such as UEs belonging to passengers of the aircraft. In some aspects, some base stations may be ATG base stations. An ATG base station is a base station (e.g., an NR gNB) that performs ATG communications with an ATG UE.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a base station, a channel state information (CSI) report configuration including configuration information that identifies a channel measurement resource (CMR) associated with a first numerology and configuration information that identifies an interference measurement resource (IMR) associated with a second numerology that is different from the first numerology; perform a channel measurement on the channel measurement resource associated with the first numerology and an interference measurement on the IMR associated with the second numerology; and transmit, to the base station, a CSI report based at least in part on the channel measurement and the interference measurement. Additionally, or alternatively, the communication manager 140 may perform one or more other operations described herein.

In some aspects, as described in more detail elsewhere herein, the communication manager 140 may receive, from a base station, configuration information indicating a configured bandwidth part (BWP) for communicating with the base station and one or more BWP mirrors associated with the configured BWP, wherein the one or more BWP mirrors correspond to a same BWP as the configured BWP and different numerologies from a numerology associated with the configured BWP; receive, from the base station, an indication to switch from the configured BWP to a BWP mirror associated with the configured BWP; and communicate with the base station using the BWP mirror associated with the configured BWP. Additionally, or alternatively, the communication manager 140 may perform one or more other operations described herein.

In some aspects, the base station 110 may include a communication manager 150. As described in more detail elsewhere herein, the communication manager 150 may transmit, to a UE, a CSI report configuration including configuration information that identifies a channel measurement resource associated with a first numerology and configuration information that identifies an IMR associated with a second numerology that is different from the first numerology; and receive, from the UE, a CSI report based at least in part on a channel measurement on a channel measurement resource associated with the first numerology and an interference measurement on the IMR associated with the second numerology. Additionally, or alternatively, the communication manager 150 may perform one or more other operations described herein.

In some aspects, as described in more detail elsewhere herein, the communication manager 150 may transmit, to a UE, configuration information indicating a configured BWP and one or more BWP mirrors associated with the configured BWP, wherein the one or more BWP mirrors correspond to a same BWP as the configured BWP and different numerologies from a numerology associated with the configured BWP; transmit, to the UE, an indication to switch from the configured BWP to a BWP mirror associated with the configured BWP; and communicate with the UE using the BWP mirror associated with the configured BWP. Additionally, or alternatively, the communication manager 150 may perform one or more other operations described herein.

As indicated above, FIG. 1 is provided as an example. Other examples may differ from what is described with regard to FIG. 1.

Figure 2:
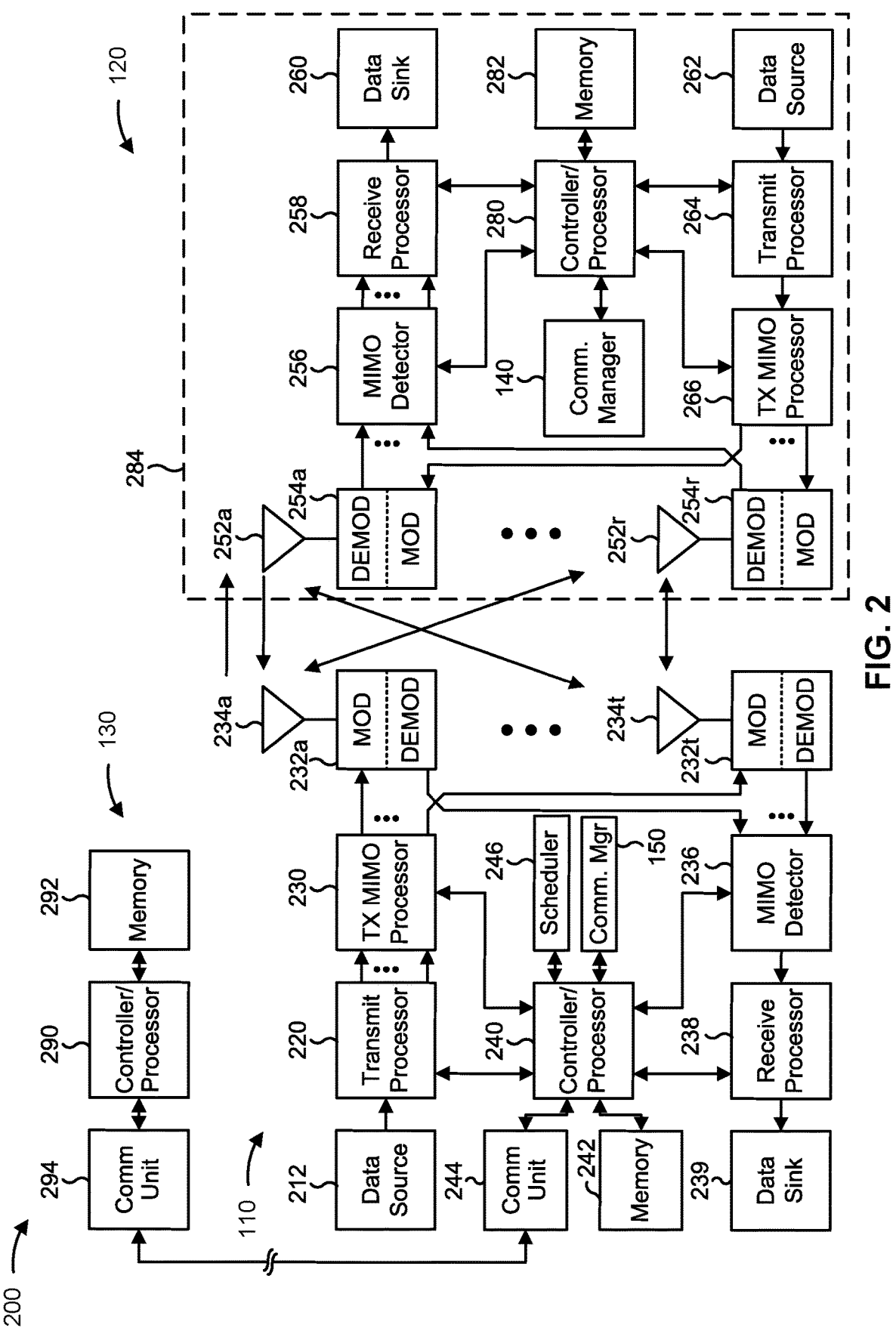
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10).

Controller/processor 240 of base station 110, controller/processor 280 of UE 120, and/or any other component(s) of FIG. 2 may perform one or more techniques associated with ATG signaling enhancement for supporting multiple numerologies, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE 120 includes means for receiving, from a base station, a CSI report configuration including configuration information that identifies a channel measurement resource associated with a first numerology and configuration information that identifies an IMR associated with a second numerology that is different from the first numerology; means for performing a channel measurement on the channel measurement resource associated with the first numerology and an interference measurement on the IMR associated with the second numerology; and/or means for transmitting, to the base station, a CSI report based at least in part on the channel measurement and the interference measurement. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the UE 120 includes means for receiving, from a base station, configuration information indicating a configured BWP for communicating with the base station and one or more BWP mirrors associated with the configured BWP, wherein the one or more BWP mirrors correspond to a same BWP as the configured BWP and different numerologies from a numerology associated with the configured BWP; means for receiving, from the base station, an indication to switch from the configured BWP to a BWP mirror associated with the configured BWP; and/or means for communicating with the base station using the BWP mirror associated with the configured BWP. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE, a CSI report configuration including configuration information that identifies a channel measurement resource associated with a first numerology and configuration information that identifies an IMR associated with a second numerology that is different from the first numerology; and/or means for receiving, from the UE, a CSI report based at least in part on a channel measurement on a channel measurement resource associated with the first numerology and an interference measurement on the IMR associated with the second numerology. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting, to a UE, configuration information indicating a configured BWP and one or more BWP mirrors associated with the configured BWP, wherein the one or more BWP mirrors correspond to a same BWP as the configured BWP and different numerologies from a numerology associated with the configured BWP; means for transmitting, to the UE, an indication to switch from the configured BWP to a BWP mirror associated with the configured BWP; and/or means for communicating with the UE using the BWP mirror associated with the configured BWP. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
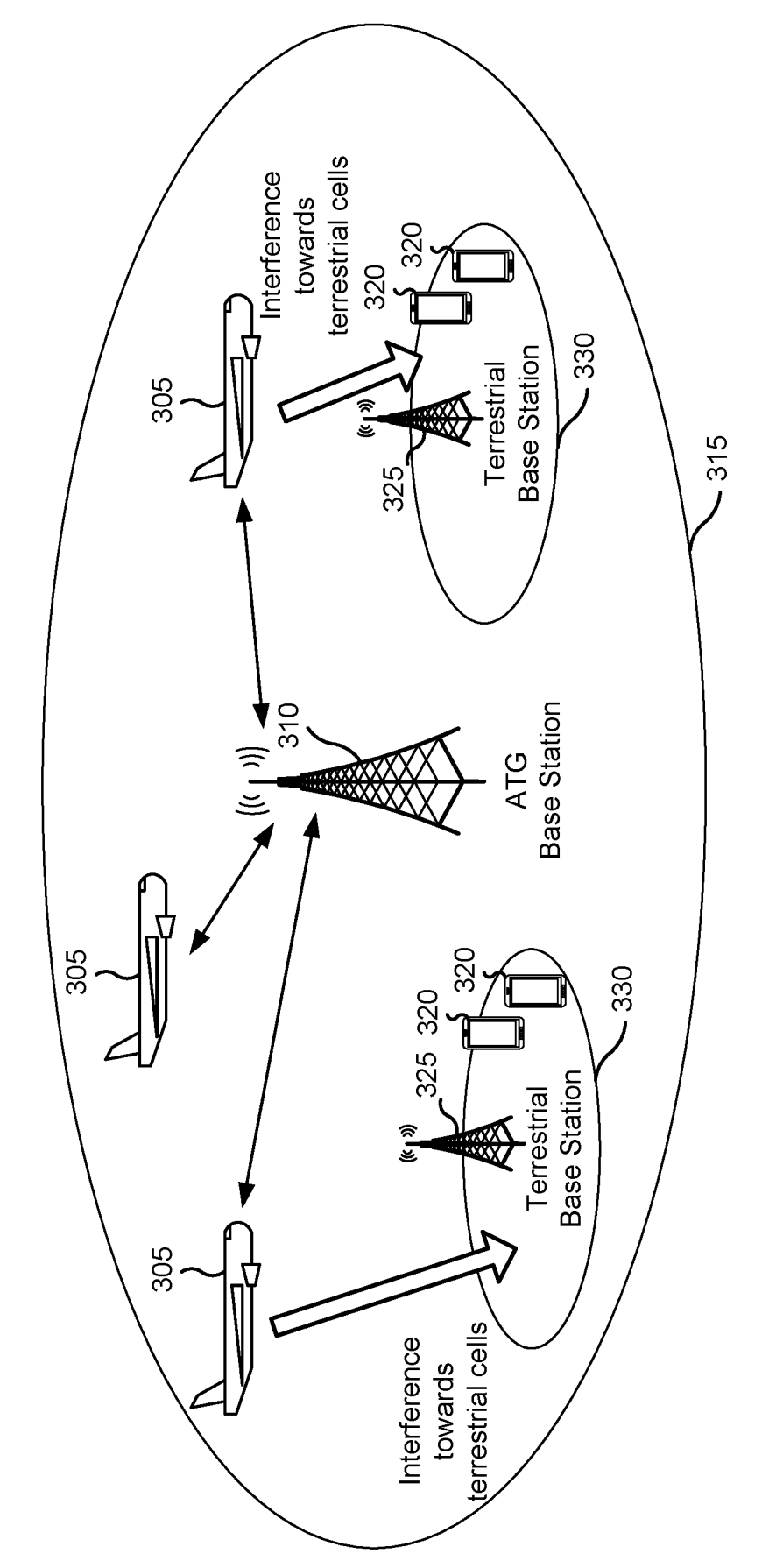
FIG. 3 is a diagram illustrating an example of an air-to-ground (ATG) network, in accordance with the present disclosure.

FIG. 3 is a diagram illustrating an example 300 of an ATG network, in accordance with the present disclosure. In some aspects, the ATG network may be a 5G/NR network.

As shown in FIG. 3, the ATG network may include one or more ATG UEs 305 and an ATG base station 310. The ATG UE 305 may be, may include, or may be included in an onboard terminal and/or CPE on an aircraft. The ATG UE 305 may include components of UE 120 described elsewhere herein. The ATG base station 310 may be a ground-based base station (e.g., a 5G/NR gNB) that transmits signals to and receives signals from the ATG UEs 305. The ATG base station 310 may include components of base station 110 described elsewhere herein. In some aspects, the ATG UE 305 may communicate with the ATG base station 310 to provide network connectivity (e.g., via Wi-Fi or a small cell network) to other UEs on the aircraft, such as UEs belonging to passengers of the aircraft.

In some aspects, a cell 315 associated with the ATG base station may have an extremely large coverage range, such as up to 300 km. In some cases, the ATG UEs 305 and ATG base station 310, in the ATG network, may communicate using a same frequency band as terrestrial UEs 320 and terrestrial base stations 325 in terrestrial networks. As used herein, "terrestrial UE" may refer to any UE that is not an ATG UE, and "terrestrial base station" may refer to any base station that is not an ATG base station. In some aspects, an ATG UE 305 may be more powerful than a terrestrial UE 320. For example, the ATG UE 305 may transmit with a higher effective isotropic radiated power (EIRP), via a larger transmission power and/or a larger on-board antenna gain, as compared with the terrestrial UE 320.

ATG channel power delay profile (PDP) and Doppler measurements may be significantly higher than such measurements in a terrestrial network. In some cases, due to such large ATG channel PDP and Doppler measurements, the ATG UEs 305 and the ATG base station 310 may use different numerologies for OFDM communications, as compared to terrestrial networks. "Numerology" for OFDM refers to a configuration of waveform parameters, such as subcarrier spacing (SCS), OFDM symbol duration, cyclic prefix (CP), total symbol duration, and/or number of OFDM symbols per slot. Different numerologies may correspond to different sets of configured OFDM waveform parameters.

The PDP for an ATG UE 305 may vary due to a flight stage (e.g., en route cruise, climb and descent, or takeoff and landing), terrain (e.g., mountains), or the presence of other obstacles (e.g., buildings) that may affect line of sight (LoS) between the ATG UE 305 and the ATG base station 310. For example, mountains may cause a large multipath delay for an ATG UE 305. In some examples, a distinctive delay for an ATG UE 305 may approach 2.5 km (or 8.33 µs). In some aspects, for OFDM communications, a numerology with a CP that is greater than the delay may be used to avoid inter-symbol interference. Doppler measurements may be based at least in part on a speed of the aircraft. In some examples, an aircraft including an ATG UE 305 may travel at speeds up to 1200 km/hour. In some aspects, a numerology with a large SCS may be used to compensate for large a Doppler spread (e.g., due to multipath Doppler measurements) for an ATG UE 305.

In cases in which an ATG network and a terrestrial network co-exist, a possible way to multiplex ATG communications and terrestrial network communications is using frequency division multiplexing (FDM). However, multiplexing ATG communications and terrestrial network communications using FDM may suffer from spectral inefficiency. Another more spectral-efficient way to multiplex ATG communications and terrestrial network communications is to allow non-orthogonal use of radio frequencies among ATG communications and terrestrial network communications. However, as shown in FIG. 3, interference from ATG UEs 305 toward terrestrial cells 330 may adversely affect communications between terrestrial UEs 320 and terrestrial base stations 325. In time division duplexing (TDD), the ATG UE 305 may cause interference to uplink reception by the terrestrial base station 325 and/or interference to downlink reception by the terrestrial UEs 320. In frequency division duplexing (FDD), the ATG UE 305 may cause interference to uplink reception by the terrestrial base station 325, or, in a case in which the uplink and downlink frequency bands are used in reverse for ATG communications, may cause interference to downlink reception by the terrestrial UEs 320. Such interference, from the ATG UEs 305, may not be synchronized to the communications in the terrestrial cells 330. For example, interference from different space division multiplexed ATG UEs 305 may be asynchronized due to different propagation delays. Furthermore, the ATG communications may use different numerologies or waveforms from the terrestrial network communications.

As indicated above, FIG. 3 is provided as an example. Other examples may differ from what is described with respect to FIG. 3.

FIG. 4 is a diagram illustrating an example 400 of numerologies for orthogonal OFDM-based communications, in accordance with the present disclosure.

As shown in FIG. 4, each numerology may correspond to a respective set of OFDM waveform parameters, and each numerology may be identified using a respective numerology parameter (u). As described above, in some aspects, ATG communications may use different numerologies than terrestrial network communications. As shown in FIG. 4, reference numbers 405, 410, 415, and 420 show example numerologies configured for ATG communications. In some aspects, a numerology for ATG communications with SCS=7.5 kHz at a frequency of 700 MHz may be determined by doubling the OFDM waveform parameters in the numerology u=0 (SCS=15 kHz), resulting in a CP of 9.40 µs. As shown by reference number 405, a first numerology (e.g., u=−1) may be configured for SCS=7.5 kHz at 700 MHz with a slot that occupies 1 ms with 7 symbols. As shown by reference number 410, a second numerology (e.g., u=−1B) may be configured for SCS=7.5 at 700 kHz with a slot that occupies 2 ms with 14 symbols. As shown by reference number 415, a numerology (e.g., u=1 (ECP)) may be configured for SCS=30 kHz at a frequency of 3.5 GHz with an extended CP (ECP) of 8.33 µs and 12 symbols per slot. As shown by reference number 420, a numerology (e.g., u=2 (eECP)) may be configured for SCS=60 kHz at a frequency of 4.8 GHz with an extended ECP (eECP) of 8.33 µs and 10 symbols per slot.

As indicated above, FIG. 4 is provided as an example. Other examples may differ from what is described with respect to FIG. 4.

As described above, a numerology for ATG communications may be selected to compensate for ATG channel PDP and Doppler measurements. In some cases, different flight scenarios, such as flight stages, terrain, or other obstacles to LoS between an ATG UE and an ATG base station may cause large changes in the ATG channel PDP profile and Doppler measurements. Accordingly, a most appropriate or efficient numerology for ATG communications may change based at least in part on changing flight scenarios for an ATG UE. However, there is currently no signaling to efficiently switch between different numerologies for ATG communications between an ATG UE and an ATG base station. As a result, an ATG UE may communicate with an ATG base station using a numerology that is efficient for some flight scenarios, but inefficient for other flight scenarios. This may cause increased latency and decreased throughput of network traffic transmitted to and/or from the ATG UE.

Some techniques and apparatuses described herein enable a UE, such as an ATG UE, to receive, from a base station, configuration information indicating a configured BWP for communicating with the base station and one or more BWP mirrors associated with the configured BWP. The one or more BWP mirrors may correspond to a same BWP as the configured BWP and different numerologies from a numerology associated with the configured BWP. The UE may receive, from the base station, an indication to switch from the configured BWP to a BWP mirror associated with the configured BWP. The UE, based at least in part on receiving the indication, may communicate with the base station using the BWP mirror associated with the configured BWP. As a result, the UE may switch between different numerologies without a large increase in control overhead and/or radio resource control (RRC) configuration overhead. By switching between different numerologies (e.g., based at least in part on different flight scenarios), an ATG UE may increase spectral efficiency, which may result in decreased latency and increased throughput for network traffic transmitted to and/or from the UE.

In some cases, ATG UEs may cause interference with communications to and/or from terrestrial UEs and/or other ATG UEs. An ATG UE may communicate using a different numerology from a numerology used by a terrestrial UE or a numerology used by another ATG UE. However, a UE may not be able to measure interference on a signal with a different numerology from a numerology associated with an active BWP for the UE. As a result, a UE (e.g., a terrestrial UE or an ATG UE) may not be able to measure interference from an ATG UE using a different numerology, and a base station may not be able to schedule downlink and/or uplink transmissions to reduce interference from the ATG UE. This may cause a decrease in signal quality and network reliability.

Some techniques and apparatuses described herein enable a UE to receive, from a base station, a CSI report configuration including configuration information that identifies a CMR associated with a first numerology and configuration information that identifies an IMR associated with a second numerology that is different from the first numerology. The UE may perform a channel measurement on the CMR associated with the first numerology and an interference measurement on the IMR associated with the second numerology. The UE may transmit, to the base station, a CSI report based at least in part on the channel measurement and the interference measurement. As a result, the UE may measure interference from communications using a different numerology from the numerology associated with the channel measurement (e.g., the numerology associated with the active BWP for the UE). For example, a UE may measure interference from ATG communications associated with an ATG UE that uses a different numerology from the numerology used by the UE. In some aspects, a base station may schedule communications with the UE to reduce interference from the ATG UE, which may cause an increase in signal quality and network reliability.

Figure 5:
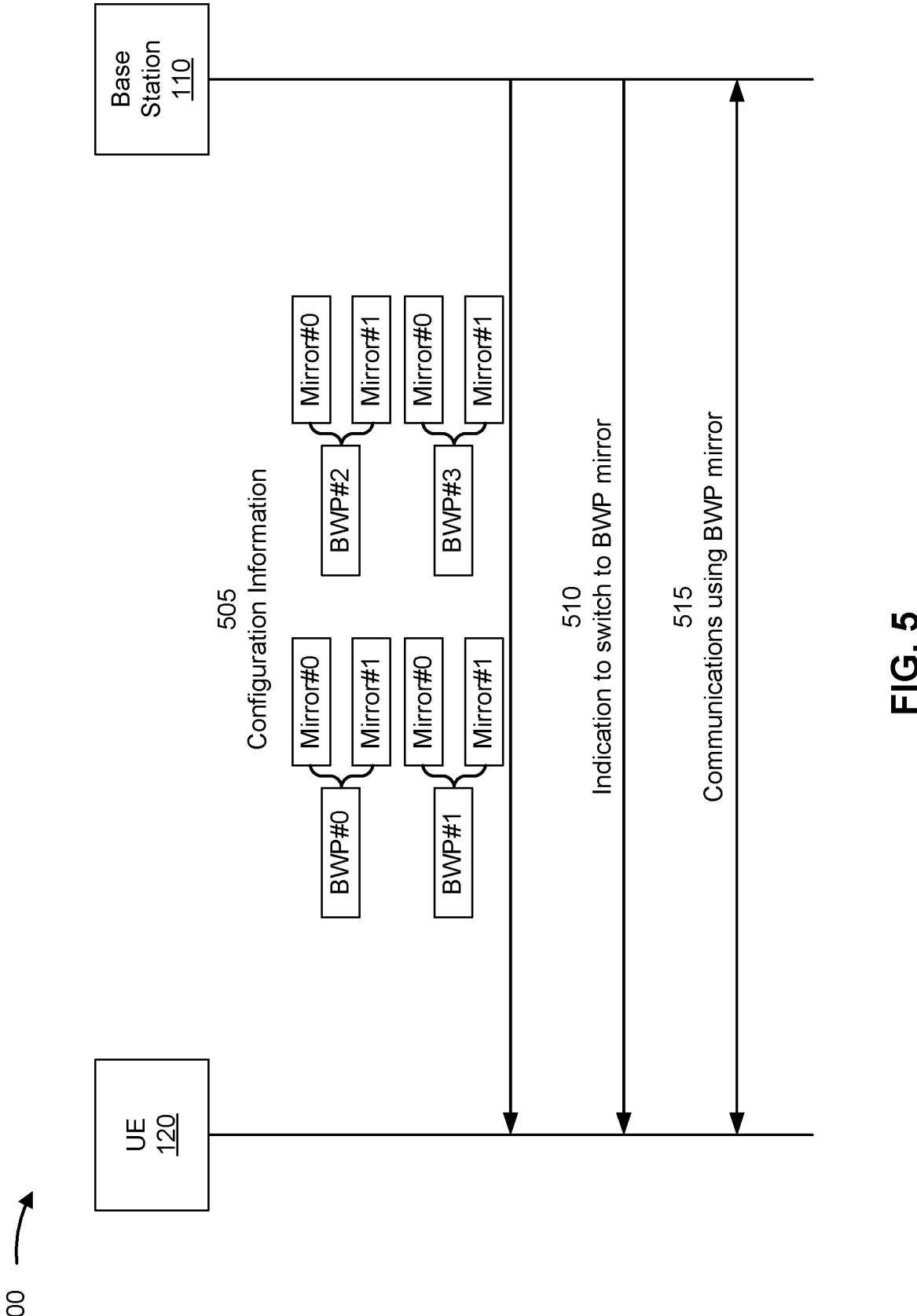
FIG. 5 is a diagram illustrating an example associated with ATG signaling enhancement to support multiple numerologies, in accordance with the present disclosure.

FIG. 5 is a diagram illustrating an example 500 associated with ATG signaling enhancement to support multiple numerologies, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. In some aspects, the UE 120 may be an ATG UE (e.g., ATG UE 305), as described elsewhere herein. In some aspects, the base station 110 may be an ATG base station (e.g., ATG base station 310), as described elsewhere herein.

As shown in FIG. 5, and by reference number 505, the base station 110 may transmit, and the UE 120 may receive, configuration information that indicates a configured BWP for the UE 120 to use to communicate with the base station 110. In some aspects, the configuration information may include one or more BWP mirrors associated with the configured BWP. The BWP mirrors associated with the configured BWP part correspond to the same BWP (e.g., the same frequency band) as the configured BWP, but may be associated with different numerologies from a numerology associated with the configured BWP.

In some aspects, the configuration information may identify multiple configured BWPs and one or more mirror BWP mirrors associated with each of the configured BWPs. For example, as shown in FIG. 5, the configuration information may identify four configured BWPs (BWP #0, BWP #1, BWP #2, and BWP #3) in a component carrier used for communications between the UE 120 and the base station 110. As further shown in FIG. 5, for each of the configured BWPs, the configuration may identify two BWP mirrors (Mirror #0 and Mirror #1) associated with that configured BWP. In this example, a configured BWP (e.g., BWP #0) may be associated with a first numerology. A first BWP mirror (e.g., Mirror #0) associated with the configured BWP may correspond to the same BWP as the configured BWP, but may be associated with a second numerology. A second BWP mirror (e.g., Mirror #1) associated with the configured BWP may correspond to the same BWP as the configured BWP, but may be associated with a third numerology.

In some aspects, each of the one or more BWP part mirrors associated with a configured BWP may be identical to the original configured BWP, except for being configured with one or more different OFDM waveform parameters. For example, each BWP mirror associated with a configured BWP may have at least one of a different SCS, a different CP length, a different OFDM symbol duration, a different total symbol duration, or a different number of symbols per slot from the configured bandwidth part. In some aspects, the configuration information may indicate, for each of the BWP mirrors, a numerology parameter (e.g., u) or index value associated with a predefined numerology (e.g., a predefined set of OFDM waveform parameters). In some aspects, the configuration information may indicate, for each of the BWP mirrors, one or more configured OFDM waveform parameters (e.g., SCS, CP length, OFDM symbol duration, total symbol duration, and/or number of symbols for slots) for that BWP mirror. For example, the configuration information may indicate one or more OFDM waveform parameters that are different from the corresponding parameters in the numerology associated with the original configured BWP.

In some aspects, a BWP mirror may have one or more RRC parameters, associated with at least one of SCS, CP length, OFDM symbol duration, total symbol duration, or number of symbols per slot, that are different from corresponding RRC parameters of the original configured BWP. For example, a BWP mirror may have different RRC parameters associated with one or more of a resource block (RB) grouping, a slot-format, and/or a timeline, among other examples, as compared with the RRC parameters for the original configured BWP. In some aspects, the RRC parameters for the BWP mirrors may be explicitly configured in the configuration information. In some aspects, the UE 120 may implicitly derive the RRC parameters for the BWP mirrors based at least in part on indications of predefined numerologies for the BWP mirrors or indications of configured OFDM waveform parameters (e.g., SCS, CP length, OFDM symbol duration, total symbol duration, and/or number of symbols for slots) for the BWP mirrors in the configuration information.

In a case in which the configuration information identifies multiple configured BWPs, the configuration information may indicate that one of the configured BWPs is an active BWP for the UE 120 to use to communicate with the base station 110.

In some aspects, the configuration may configure different numerologies for the UE 120 to receive downlink communications from the base station 110 and for the UE 120 to transmit uplink communications to the base station 110. For example, the configuration information may indicate a first numerology for downlink communications and a second numerology for uplink communications. In some aspects, the configuration information may configure a first BWP having the first numerology for downlink communications and a second BWP having the second numerology for uplink communications. In some aspects, a configured BWP may be used for one of uplink or downlink communications, and a BWP mirror associated with the configured BWP may be used for the other one of uplink or downlink communications. In some aspects, the configuration information may indicate a duration for a time gap to be applied between downlink communications and uplink communications using different numerologies (and/or between uplink and downlink communications using different numerologies).

As further shown in FIG. 5, and by reference number 510, the base station 110 may transmit, to the UE 120, an indication to switch from a current active BWP to a BWP mirror associated with the current active BWP. The UE 120 may receive the indication, and may switch from the current active BWP to the BWP mirror associated with the current active BWP. For example, the current active BWP may be an original configured BWP, and the indication may be an indication to switch from the original configured BWP to a BWP mirror associated with that configured BWP.

In some aspects, the indication may be transmitted via at least one of an RRC message, a medium access control (MAC) control element (MAC-CE), or downlink control information (DCI). In some aspects, for a DCI-based switch indication, one or more reserved bits or invalid bits in a DCI format may be used to transmit the indication. For example, based on a value in a BWP-switch field in the DCI, the UE 120 may switch the current BWP to a BWP mirror associated with the current BWP (instead of switching to a different configured BWP).

In some aspects, the UE 120 may receive, from the base station 110, an indication to switch back to an original configured BWP from a BWP mirror associated with the original configured BWP. For example, a bit field in the DCI may be used for the indication to switch back to the original configured BWP from the BWP mirror. The UE 120 may switch back to the original configured BWP from the BWP mirror based at least in part on receiving the indication to switch back to the original BWP.

In some aspects, the base station 110 may transmit the indication to switch to the BWP mirror, and/or the indication to switch back to the original configured BWP, based at least in part on a current flight scenario associated with the UE 120 (e.g., an ATG UE). For example, the base station 110 may transmit the indication(s) to change a numerology used for communicating with the UE 120 based at least in part on changing flight stages (e.g., en route cruise, climb and descent, or takeoff and landing) or changing terrain, among other examples. In some aspects, the base station 110 may transmit the indication(s) based at least in part on changing delay measurements and/or Doppler measurements associated with the UE 120.

As further shown in FIG. 5, and by reference number 515, the UE 120 may communicate with the base station 110 using the BWP mirror and the numerology associated with the BWP mirror. For example, the UE 120 may receive downlink communications transmitted by the base station 110 using the BWP mirror and the numerology associated with the BWP mirror. Additionally, or alternatively, the UE 120 may transmit, to the base station 110, uplink communications using the BWP mirror and the numerology associated with the BWP mirror.

In some aspects, separate numerologies may be configured for the UE 120 for uplink and downlink communications. In some aspects, the UE 120 may be configured to operate FDD/TDD within a certain BWP. However, for downlink communications, the UE 120 may be configured with a first numerology (e.g., SCS=60 kHz and CP length=1.17 μs with 14 symbols per slot), while for uplink communications, the UE 120 may be configured with a second numerology (e.g., SCS=60 kHz and CP length—8.32 μs with 10 symbols per slot). For example, a reason to configure uplink and downlink numerologies for an ATG UE is that the UE 120 and the base station 110 may have different beamforming and/or antenna array capabilities. For example, the base station 110 may have a stronger transmission beamforming capability with a directional antenna-array, which may result in less multipath seen at the UE 120 for downlink communications. The UE 120 may be an ATG UE that uses omnidirectional antennas with a weaker transmission beamforming capability (e.g., due to motions and vibrations), which may result in more multipath seen at the base station 110 for uplink communications.

In some aspects, in a case in which the UE 120 is configured with a first numerology for downlink communications and a second numerology for uplink communications, the UE 120 may apply a time gap between downlink communications (e.g., downlink durations) using the first numerology and uplink communications (e.g., uplink durations) using the second numerology. In some aspects, the UE 120 may also apply the time gap between uplink communications and downlink communications. The UE 120 may apply the time gap to ensure overall time domain alignment for the uplink and downlink communications. In some aspects, the duration of the time gap may be indicated in the configuration information transmitted to the UE 120 by the base station 110. In some aspects, the UE 120 may apply a time gap having a predefined duration.

In some aspects, the UE 120 may perform rate-matching around signals associated with a different numerology from the numerology associated with the current active BWP for the UE 120. In some aspects, a configuration used for the rate-matching is based at least in part on RRC parameters associated with the different numerology. In some aspects, the configuration for the rate-matching may be based at least in part on the indication of the bandwidth part mirror received from the base station 110.

Due to unmatched symbol alignment among different numerologies (e.g., u=1 to rate-match around u=2 (eECP)), some symbols within the current active BWP may be partially affected by the signals (associated with the different numerology) to be rate-matched around. In some aspects, the UE 120 may rate-match around the partially affected symbols in the current active BWP. In some aspects, the UE 120 may determine whether the partially affected symbols in the current active BWP are within the duration of the CP, and the UE 120 may forgo rate-matching around the partially affected symbols that are only within the duration of the CP. For example, a UE-specific physical downlink shared channel (PDSCH) communication may be transmitted using a highly directional beam, whereas synchronization signal blocks (SSBs) of a different numerology may being transmitted using a wide beam. In this case, the UE 120 may consider the SSBs as interference towards the UE-specific PDSCH if the impact is only within the CP duration, while there is limited interference from the UE-specific PDSCH towards the SSB due to the narrow beam used to transmit the PDSCH.

As described above in connection with FIG. 5, the UE 120, such as an ATG UE, may receive, from the base station 110, configuration information indicating a configured BWP for communicating with the base station and one or more BWP mirrors associated with the configured BWP. The one or more BWP mirrors may correspond to a same BWP as the configured BWP and different numerologies from a numerology associated with the configured BWP. The UE 120 may receive, from the base station 110, an indication to switch from the configured BWP to a BWP mirror associated with the configured BWP. The UE, based at least in part on receiving the indication, may communicate with the base station using the BWP mirror associated with the configured BWP. As a result, the UE may switch between different numerologies without a large increase in control overhead and/or RRC configuration overhead. By switching between different numerologies (e.g., based at least in part on different flight scenarios), the UE 120 (e.g., an ATG UE) may increase spectral efficiency, which may result in decreased latency and increased throughput for network traffic transmitted to and/or from the UE 120.

As indicated above, FIG. 5 is provided as an example. Other examples may differ from what is described with respect to FIG. 5.

Figure 6:
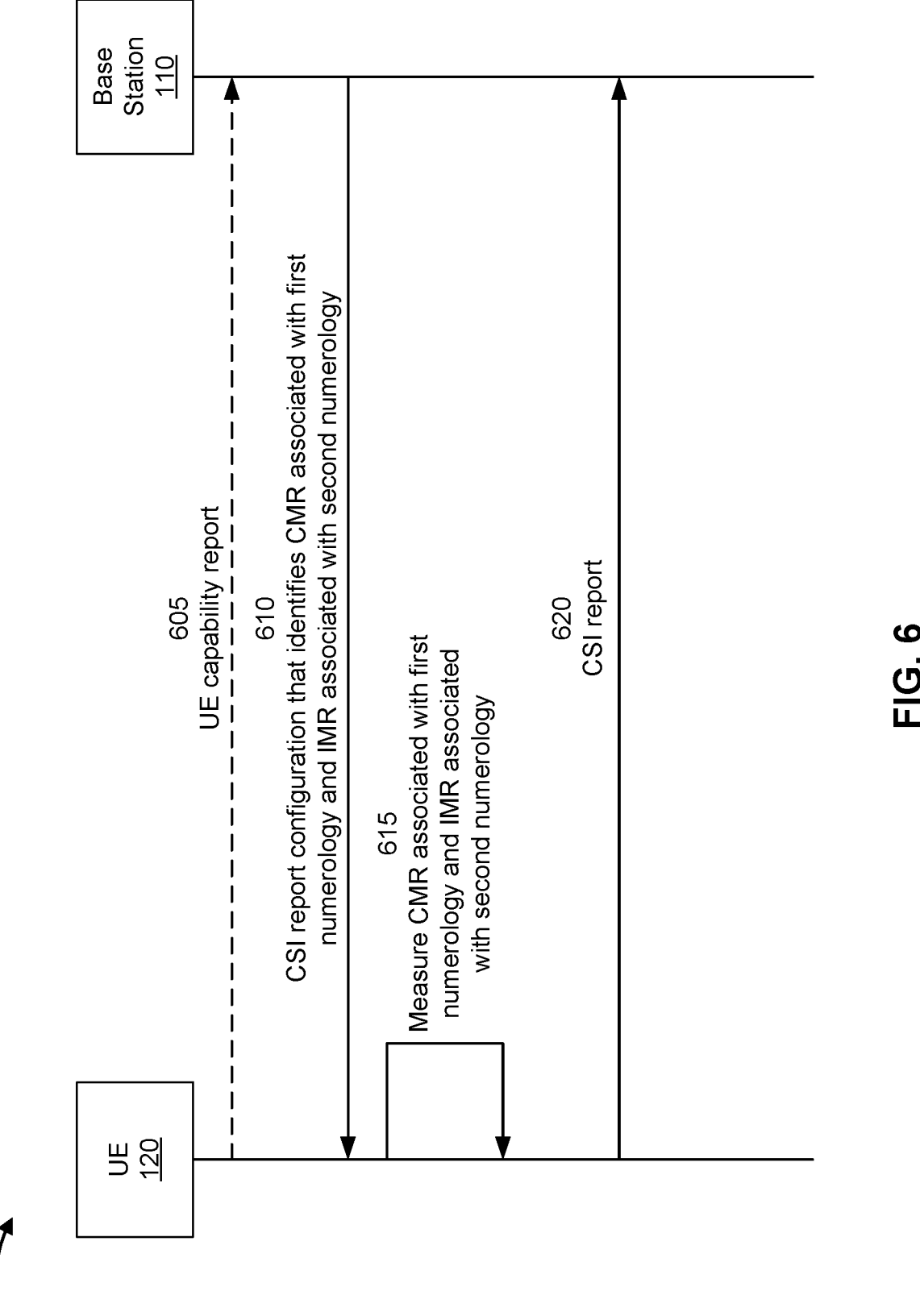
FIG. 6 is a diagram illustrating an example associated with ATG signaling enhancement for cross-numerology interference measurements, in accordance with the present disclosure.

FIG. 6 is a diagram illustrating an example 600 associated with ATG signaling enhancement for cross-numerology interference measurements, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. In some aspects, the UE 120 may be a terrestrial UE (e.g., a non-ATG UE). In some aspects, the UE 120 may be an ATG UE (e.g., ATG UE 305), as described elsewhere herein.

As shown in FIG. 6, and by reference number 605, the UE 120 may transmit, to the base station 110, a UE capability report. In some aspects, the UE capability report may indicate a capability of the UE 120 for jointly monitoring different numerologies for IMRs and CMRs. For example, the UE capability report may indicate a capability of the UE 120 for CSI reporting for CMR and IMR numerology combinations. In some aspects, the UE capability report may indicate a number of numerologies and/or types of numerologies that the UE 120 is capable of simultaneously monitoring for a same CSI report. Additionally, or alternatively, the UE capability report may indicate a number of numerologies and/or types of numerologies associated with a number of CSI reports, and/or associated with a number of CSI processing units. In some aspects, the UE capability report may indicate specific combinations of numerologies that may be supported for joint CMR and IMR monitoring. In some aspects, the UE capability report may indicate that the UE 120 supports any combination of a set of numerologies, such as numerologies specified in a wireless communication standard and/or the numerologies shown in FIG. 4.

As further shown in FIG. 6, and by reference number 610, the base station 110 may transmit, to the UE 120, a CSI report configuration that identifies a CMR associated with a first numerology and an IMR associated with a second numerology. The second numerology may be different from the first numerology. In some aspects, the base station 110 may transmit the CSI report configuration to the UE 120 in an RRC message (e.g., CSI-ReportConfig).

The CSI report configuration may indicate various CSI reporting settings. For example, the CSI report configuration may include configuration information that identifies resource settings (e.g. CSI-ResourceConfig) for the CMR and configuration information that identifies resource settings for the IMR. Accordingly, the CMR associated with the first numerology and the IMR associated with the second numerology may be associated with the same CSI reporting settings. In some aspects, the base station 110 may determine the resource settings and numerologies for the CMR and the IMR based at least in part on the UE capability report. In some aspects, the CMR may be non-zero-power CSI reference signal (NZP-CSI-RS) resource. In some aspects, the first numerology may correspond to the numerology associated with the current active BWP for the UE 120.

In some aspects, the IMR may be a CSI reference signal (CSI-RS) resource or a CSI interference measurement (CSI-IM) resource that is associated with a different numerology (e.g., the second numerology) from the numerology (e.g., the first numerology) associated with the CMR. For example, the second numerology may have at least one of a different SCS, a different CP length, a different OFDM symbol duration, a different total symbol duration, or a different number of symbols per slot from the first numerology. In some aspects, numerology information that identifies the second numerology associated with the IMR may be included in the configuration information that identifies the IMR (e.g., the resource settings for the IMR). For example, the numerology information may indicate at least one of the SCS, the CP length, the OFDM symbol duration, the total symbol duration, or the number of symbols per slot for the second numerology. In some aspects, the numerology information may include an indication of a numerology parameter (e.g., u) or index value that corresponds to a set of OFDM waveform parameters.

In some aspects, one or more BWP mirrors may be configured to indicate the second numerology for the IMR. For example, the configuration information for the IMR may include an indication that links the IMR with a BWP mirror associated with a current BWP. As described above in connection with FIG. 5, the BWP mirror may be configured to have the same BWP as the current BWP and a different numerology from a numerology associated with the current BWP. In this case, the current BWP may be associated with the first numerology and the BWP mirror may be associated with the second numerology.

In some aspects, the BWP mirror associated with the second numerology may be configured with indications of only the OFDM waveform parameters that are different from the corresponding parameters in the first numerology. In some aspects, the current BWP and the BWP mirror may be configured in a separate configuration from the CSI report configuration. For example, the UE 120 may receive, from the base station 110, configuration information that identifies a plurality of BWPs including the current BWP and one or more other BWPs and identifies, for each BWP of the plurality of BWPs, one or more BWP mirrors associated with that BWP.

In some aspects, the IMR, configured for the UE 120, may be a periodic IMR. In this case, the UE 120 may receive, from the base station 110, time-domain drifting information associated with the IMR. In some aspects, the time-domain drifting information may include a time-domain offset associated with a starting slot of the IMR and time-domain drifting rate information that indicates an update to the time-domain offset after a number of slots or symbols. For example, the time domain offset may be indicated using a number of symbols of the monitored BWP or explicit time units. The time-domain drifting rate information may indicate how much more offset is to be applied by the UE 120 after a certain number of slots or symbols. For example, the time-domain drifting rate information may be indicated using a number of symbols or in explicit time units.

In some aspects, the time-domain drifting information (e.g., the time domain offset and the time domain drifting rate information) associated with the IMR may be included in the configuration information that identifies the IMR. In this case, the time-domain drifting information may be IMR-specifically configured or configured for an IMR set. For example, the time-domain drifting information may be indicated in an information element (IE) associated with a particular IMR or IMR-set.

In some aspects, the CSI report configuration may indicate one or more time-domain drifting information configurations, each associated with a respective time-domain drifting information identifier. For example, the one or more time-domain drifting information configurations may be associated with one or more respective other UEs. In some aspects, the one or more other UEs may be one or more ATG UEs. The time-domain drifting information associated with the IMR may be indicated in a first time-domain information configuration of the one or more time-domain drifting information configurations. In some aspects, the configuration information that identifies the IMR may include an indication of a time-domain drifting information identifier for one of the one or more time-domain drifting information configurations. For example, the configuration information for the IMR may include an indication of the time-domain drifting information identifier associated with the first time-domain information configuration.

In some aspects, the base station 110 may transmit, and the UE 120 may receive, an update to the time-domain drifting information associated with the IMR. For example, the base station 110 may transmit, to the UE 120, an update to the time-domain drifting information included in the configuration information. In some aspects, the base station 110 may transmit the update to the time-domain drifting information via at least one of an RRC message, a MAC-CE, or DCI.

In some aspects, in addition to the configuration information identifying the CMR associated with the first numerology and the configuration identifying the IMR associated with the second numerology, the CSI report configuration may also include configuration information identifying one or more other IMRs. For example, the CSI report may also include configuration information identifying another IMR that is associated with the first numerology and/or another IMR that is associated with a third numerology.

As further shown in FIG. 6, and by reference number 615, the UE 120 may measure the CMR associated with the first numerology, and the UE 120 may measure the IMR associated with the second numerology. The UE 120 may perform a channel measurement on the CMR associated with the first numerology. For example, the UE 120 may measure a signal strength of the channel on the CMR. The UE 120 may perform an interference measurement on the IMR associated with the second numerology. For example, the UE 120 may measure an interference strength on the IMR.

In some aspects, the UE 120 may apply the time-domain drifting information associated with the IMR when performing the interference measurement on the IMR. For example, the UE 120 may apply the time-domain offset to the starting slot for measuring the IMR, and the UE 120 may update the time-domain offset after a number of slots or symbols based at least in part on the time-domain drifting rate information.

In some aspects, the interference measurement on the IMR associated with the second numerology may be a measurement of interference from another UE that transmits and receives signals using a different numerology (e.g., the second numerology) from the numerology (e.g., the first numerology) associated with the current active BWP for the UE 120. In some aspects, the interference measurement on the IMR associated with the second numerology may be a measurement of interference from an ATG UE. For example, the UE 120 may be a terrestrial UE that measures the interference from an ATG UE, or the UE 120 may be an ATG UE that measures the interference from another ATG UE that is using a different numerology.

As further shown in FIG. 6, and by reference number 620, the UE 120 may transmit, to the base station 110, a CSI report based at least in part on the channel measurement performed on the CMR and the interference measurement performed in the IMR. In some aspects, the UE 120 may calculate a signal-to-noise ratio (SNR) value based at least in part on the signal strength measurement on the CMR and the interference strength measurement on the IMR, and the UE 120 may calculate a CQI value based at least in part on the SNR value. In some aspects, the CSI report may include the CQI value, as well as values for other parameters, such as a precoding matrix indicator (PMI), a layer indicator (LI), and/or a rank indicator (RI), among other examples.

The base station 110 may receive the CSI report. In some aspects, the base station 110 may schedule one or more communications based at least in part on the CSI report. For example, the base station 110 may schedule and transmit one or more downlink communications (e.g., PDSCH communications) based at least in part on the CSI report. In some aspects, the base station 110 may schedule the PDSCH communications and/or select transmission parameters for transmitting the PDSCH communications to reduce an effect of the interference measured on the IMR.

As described above in connection with FIG. 6, the UE 120 may receive, from the base station 110, a CSI report configuration including configuration information that identifies a CMR associated with a first numerology and configuration information that identifies an IMR associated with a second numerology that is different from the first numerology. The UE 120 may perform a channel measurement on the CMR associated with the first numerology and an interference measurement on the IMR associated with the second numerology. The UE 120 may transmit, to the base station 110, a CSI report based at least in part on the channel measurement and the interference measurement. As a result, the UE 120 may measure interference from communications using a different numerology from the numerology associated with the channel measurement (e.g., the numerology associated with the active BWP for the UE 120). For example, the UE 120 may measure interference from ATG communications associated with an ATG UE that uses a different numerology from the numerology used by the UE 120. In some aspects, the base station 110 may schedule communications with the UE 120 to reduce the effect of the interference from the ATG UE, which may cause an increase in signal quality and network reliability.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with ATG signaling enhancement to support cross-numerology interference measurements.

As shown in FIG. 7, in some aspects, process 700 may include receiving, from a base station, a CSI report configuration including configuration information that identifies a channel measurement resource associated with a first numerology and configuration information that identifies an interference measurement resource associated with a second numerology that is different from the first numerology (block 710). For example, the UE (e.g., using communication manager 140 and/or reception component 1102, depicted in FIG. 11) may receive, from a base station, a CSI report configuration including configuration information that identifies a channel measurement resource associated with a first numerology and configuration information that identifies an interference measurement resource associated with a second numerology that is different from the first numerology, as described above.

As further shown in FIG. 7, in some aspects, process 700 may include performing a channel measurement on the channel measurement resource associated with the first numerology and an interference measurement on the interference measurement resource associated with the second numerology (block 720). For example, the UE (e.g., using communication manager 140 and/or measurement component 1108, depicted in FIG. 11) may perform a channel measurement on the channel measurement resource associated with the first numerology and an interference measurement on the interference measurement resource associated with the second numerology, as described above.

As further shown in FIG. 7, in some aspects, process 700 may include transmitting, to the base station, a CSI report based at least in part on the channel measurement and the interference measurement (block 730). For example, the UE (e.g., using communication manager 140 and/or transmission component 1104, depicted in FIG. 11) may transmit, to the base station, a CSI report based at least in part on the channel measurement and the interference measurement, as described above.

Process 700 may include additional aspects, such as any single aspect or any combination of aspects described below and/or in connection with one or more other processes described elsewhere herein.

In a first aspect, the configuration information that identifies the interference measurement resource associated with the second numerology includes numerology information that identifies the second numerology associated with the interference measuring resource.

In a second aspect, alone or in combination with the first aspect, the numerology information indicates at least one of a subcarrier spacing, a cyclic prefix length, an orthogonal frequency division multiplexing symbol duration, a total symbol duration, or a number of symbols per slot for the second numerology.

In a third aspect, alone or in combination with one or more of the first and second aspects, the configuration information that identifies the interference measurement resource associated with the second numerology includes an indication that links the interference measurement resource with a bandwidth part mirror associated with a current bandwidth part, and the bandwidth part mirror is configured to have a same bandwidth part as the current bandwidth part and a different numerology from a numerology associated with the current bandwidth part.

In a fourth aspect, alone or in combination with one or more of the first through third aspects, the current bandwidth part has the first numerology and the bandwidth part mirror has the second numerology.

In a fifth aspect, alone or in combination with one or more of the first through fourth aspects, process 700 includes receiving, from the base station, configuration information that identifies a plurality of bandwidth parts including the current bandwidth part and one or more other bandwidth parts and identifies, for each bandwidth part of the plurality of bandwidth parts, one or more bandwidth mirrors associated with that bandwidth part.

In a sixth aspect, alone or in combination with one or more of the first through fifth aspects, the second numerology has at least one of a different subcarrier spacing, a different cyclic prefix length, a different orthogonal frequency division multiplexing symbol duration, a different total symbol duration, or a different number of symbols per slot from the first numerology.

In a seventh aspect, alone or in combination with one or more of the first through sixth aspects, the interference measurement resource is a periodic interference measurement resource.

In an eighth aspect, alone or in combination with one or more of the first through seventh aspects, process 700 includes receiving time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

In a ninth aspect, alone or in combination with one or more of the first through eighth aspects, the time-domain drifting information associated with the interference measurement resource is included in the configuration information that identifies the interference measurement resource.

In a tenth aspect, alone or in combination with one or more of the first through ninth aspects, the CSI report configuration indicates one or more time-domain drifting information configurations, each associated with a respective time-domain drifting information identifier, and the time-domain drifting information associated with the interference measurement resource is indicated in a first time-domain information configuration of the one or more time-domain drifting information configurations.

In an eleventh aspect, alone or in combination with one or more of the first through tenth aspects, each of the one or more time-domain drifting information configurations is associated with a respective other UE.

In a twelfth aspect, alone or in combination with one or more of the first through eleventh aspects, the configuration information that identifies the interference measurement resource indicates the time-domain drifting information identifier associated with the first time-domain information configuration.

In a thirteenth aspect, alone or in combination with one or more of the first through twelfth aspects, process 700 includes receiving an update to the time-domain drifting information associated with the interference measurement resource via at least one of an RRC message, a MAC-CE, or DCI.

In a fourteenth aspect, alone or in combination with one or more of the first through thirteenth aspects, process 700 includes transmitting, to the base station, a UE capability report indicating a capability of the UE for jointly monitoring different numerologies for interference measurement resources and channel measurement resources.

In a fifteenth aspect, alone or in combination with one or more of the first through fourteenth aspects, the interference measurement on the interference measurement resource associated with the second numerology is a measurement of interference from another UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with ATG signaling enhancement to support cross-numerology interference measurements.

As shown in FIG. 8, in some aspects, process 800 may include transmitting, to a UE, a CSI report configuration including configuration information that identifies a channel measurement resource associated with a first numerology and configuration information that identifies an interference measurement resource associated with a second numerology that is different from the first numerology (block 810). For example, the base station (e.g., using communication manager 150 and/or transmission component 1204, depicted in FIG. 12) may transmit, to a UE, a CSI report configuration including configuration information that identifies a channel measurement resource associated with a first numerology and configuration information that identifies an interference measurement resource associated with a second numerology that is different from the first numerology, as described above.

As further shown in FIG. 8, in some aspects, process 800 may include receiving, from the UE, a CSI report based at least in part on a channel measurement on a channel measurement resource associated with the first numerology and an interference measurement on the interference measurement resource associated with the second numerology (block 820). For example, the base station (e.g., using communication manager 150 and/or reception component 1202, depicted in FIG. 12) may receive, from the UE, a CSI report based at least in part on a channel measurement on a channel measurement resource associated with the first numerology and an interference measurement on the interference measurement resource associated with the second numerology, as described above.

Process 800 may include additional aspects, such as any single aspect or any combination of aspects described below and/or in connection with one or more other processes described elsewhere herein.

In a first aspect, the configuration information that identifies the interference measurement resource associated with the second numerology includes numerology information that identifies the second numerology associated with the interference measuring resource.

In a second aspect, alone or in combination with the first aspect, the numerology information indicates at least one of a subcarrier spacing, a cyclic prefix length, an orthogonal frequency division multiplexing symbol duration, a total symbol duration, or a number of symbols per slot for the second numerology.

In a third aspect, alone or in combination with one or more of the first and second aspects, the configuration information that identifies the interference measurement resource associated with the second numerology includes an indication that links the interference measurement resource with a bandwidth part mirror associated with a current bandwidth part, and the bandwidth part mirror is configured to have a same bandwidth part as the current bandwidth part and a different numerology from a numerology associated with the current bandwidth part.

In a fourth aspect, alone or in combination with one or more of the first through third aspects, the current bandwidth part has the first numerology and the bandwidth part mirror has the second numerology.

In a fifth aspect, alone or in combination with one or more of the first through fourth aspects, process 800 includes transmitting, to the UE, configuration information that identifies a plurality of bandwidth parts including the current bandwidth part and one or more other bandwidth parts and identifies, for each bandwidth part of the plurality of bandwidth parts, one or more bandwidth part mirrors associated with that bandwidth part.

In a sixth aspect, alone or in combination with one or more of the first through fifth aspects, the second numerology has at least one of a different subcarrier spacing, a different cyclic prefix length, a different orthogonal frequency division multiplexing symbol duration, a different total symbol duration, or a different number of symbols per slot from the first numerology.

In a seventh aspect, alone or in combination with one or more of the first through sixth aspects, the interference measurement resource is a periodic interference measurement resource.

In an eighth aspect, alone or in combination with one or more of the first through seventh aspects, process 800 includes transmitting, to the UE, time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

In a ninth aspect, alone or in combination with one or more of the first through eighth aspects, the time-domain drifting information associated with the interference measurement resource is included in the configuration information that identifies the interference measurement resource.

In a tenth aspect, alone or in combination with one or more of the first through ninth aspects, the CSI report configuration indicates one or more time-domain drifting information configurations, each associated with a respective time-domain drifting information identifier, and the time-domain drifting information associated with the interference measurement resource is indicated in a first time-domain information configuration of the one or more time-domain drifting information configurations.

In an eleventh aspect, alone or in combination with one or more of the first through tenth aspects, each of the one or more time-domain drifting information configurations is associated with a respective other UE.

In a twelfth aspect, alone or in combination with one or more of the first through eleventh aspects, the configuration information that identifies the interference measurement resource indicates the time-domain drifting information identifier associated with the first time-domain information configuration.

In a thirteenth aspect, alone or in combination with one or more of the first through twelfth aspects, process 800 includes transmitting, to the UE, an update to the time-domain drifting information associated with the interference measurement resource via at least one of an RRC message, a MAC-CE, or DCI.

In a fourteenth aspect, alone or in combination with one or more of the first through thirteenth aspects, process 800 includes receiving, from the UE, a UE capability report indicating a capability of the UE for jointly monitoring different numerologies for interference measurement resources and channel measurement resources.

In a fifteenth aspect, alone or in combination with one or more of the first through fourteenth aspects, process 800 includes transmitting a downlink communication to the UE based at least in part on the CSI report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with ATG signaling enhancement to support multiple numerologies.

As shown in FIG. 9, in some aspects, process 900 may include receiving, from a base station, configuration information indicating a configured bandwidth part for communicating with the base station and one or more bandwidth part mirrors associated with the configured bandwidth part, wherein the one or more bandwidth part mirrors correspond to a same bandwidth part as the configured bandwidth part and different numerologies from a numerology associated with the configured bandwidth part (block 910). For example, the UE (e.g., using communication manager 140 and/or reception component 1102, depicted in FIG. 11) may receive, from a base station, configuration information indicating a configured bandwidth part for communicating with the base station and one or more bandwidth part mirrors associated with the configured bandwidth part, wherein the one or more bandwidth part mirrors correspond to a same bandwidth part as the configured bandwidth part and different numerologies from a numerology associated with the configured bandwidth part, as described above.

As further shown in FIG. 9, in some aspects, process 900 may include receiving, from the base station, an indication to switch from the configured bandwidth part to a bandwidth part mirror associated with the configured bandwidth part (block 920). For example, the UE (e.g., using communication manager 140 and/or reception component 1104, depicted in FIG. 11) may receive, from the base station, an indication to switch from the configured bandwidth part to a bandwidth part mirror associated with the configured bandwidth part, as described above.

As further shown in FIG. 9, in some aspects, process 900 may include communicating with the base station using the bandwidth part mirror associated with the configured bandwidth part (block 930). For example, the UE (e.g., using communication manager 140, reception component 1102 and/or transmission component 1104, depicted in FIG. 11) may communicate with the base station using the bandwidth part mirror associated with the configured bandwidth part, as described above.

Process 900 may include additional aspects, such as any single aspect or any combination of aspects described below and/or in connection with one or more other processes described elsewhere herein.

In a first aspect, each of the one or more bandwidth part mirrors has at least one of a different SCS, a different CP length, a different OFDM symbol duration, a different total symbol duration, or a different number of symbols per slot from the configured bandwidth part.

In a second aspect, alone or in combination with the first aspect, each of the one or more bandwidth part mirrors has one or more radio resource control parameters, associated with at least one of SCS, CP length, OFDM symbol duration, total symbol duration, or number of symbols per slot, that are different from corresponding radio resource control parameters of the configured bandwidth part.

In a third aspect, alone or in combination with one or more of the first and second aspects, receiving the indication to switch from the configured bandwidth part to a bandwidth part mirror associated with the configured bandwidth part comprises receiving the indication to switch from the configured bandwidth part to a bandwidth part mirror associated with the configured bandwidth via an RRC message, a MAC-CE, or DCI.

In a fourth aspect, alone or in combination with one or more of the first through third aspects, process 900 includes receiving, from the base station, an indication to switch back from the bandwidth part mirror associated with the configured bandwidth part to the configured bandwidth part.

In a fifth aspect, alone or in combination with one or more of the first through fourth aspects, the configuration information indicates a first numerology for downlink communications and a second numerology for uplink communications, and process 900 includes applying a time gap between downlink communications using the first numerology and uplink communications using the second numerology.

In a sixth aspect, alone or in combination with one or more of the first through fifth aspects, the configuration information indicates a duration of the time gap.

In a seventh aspect, alone or in combination with one or more of the first through sixth aspects, process 900 includes performing rate-matching around signals associated with a different numerology from a numerology associated with a current active bandwidth part.

In an eighth aspect, alone or in combination with one or more of the first through seventh aspects, the rate-matching around the signals associated with the different numerology is based at least in part on configured radio resource control parameters associated with the different numerology.

In a ninth aspect, alone or in combination with one or more of the first through eighth aspects, the rate-matching around the signals associated with the different numerology is based at least in part on the indication of the bandwidth part mirror.

In a tenth aspect, alone or in combination with one or more of the first through ninth aspects, process 900 includes performing rate-matching around symbols in the current active bandwidth part that are partially affected by the signals associated with the different numerology.

In an eleventh aspect, alone or in combination with one or more of the first through tenth aspects, process 900 includes forgoing performance of rate-matching around symbols in the current active bandwidth that are partially affected by the signals associated with the different numerology based at least in part on a determination that symbols that are partially affected are within a cyclic prefix duration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with the present disclosure. Example process 1000 is an example where the base station (e.g., base station 110) performs operations associated with ATG signaling enhancement to support multiple numerologies.

As shown in FIG. 10, in some aspects, process 1000 may include transmitting, to a UE, configuration information indicating a configured bandwidth part and one or more bandwidth part mirrors associated with the configured bandwidth part, wherein the one or more bandwidth part mirrors correspond to a same bandwidth part as the configured bandwidth part and different numerologies from a numerology associated with the configured bandwidth part (block 1010). For example, the base station (e.g., using communication manager 150 and/or transmission component 1204, depicted in FIG. 12) may transmit, to a UE, configuration information indicating a configured bandwidth part and one or more bandwidth part mirrors associated with the configured bandwidth part, wherein the one or more bandwidth part mirrors correspond to a same bandwidth part as the configured bandwidth part and different numerologies from a numerology associated with the configured bandwidth part, as described above.

As further shown in FIG. 10, in some aspects, process 1000 may include transmitting, to the UE, an indication to switch from the configured bandwidth part to a bandwidth part mirror associated with the configured bandwidth part (block 1020). For example, the base station (e.g., using communication manager 150 and/or transmission component 1204, depicted in FIG. 12) may transmit, to the UE, an indication to switch from the configured bandwidth part to a bandwidth part mirror associated with the configured bandwidth part, as described above.

As further shown in FIG. 10, in some aspects, process 1000 may include communicating with the UE using the bandwidth part mirror associated with the configured bandwidth part (block 1030). For example, the base station (e.g., using communication manager 150, reception component 1202, and/or transmission component 1204, depicted in FIG. 12) may communicate with the UE using the bandwidth part mirror associated with the configured bandwidth part, as described above.

Process 1000 may include additional aspects, such as any single aspect or any combination of aspects described below and/or in connection with one or more other processes described elsewhere herein.

In a first aspect, each of the one or more bandwidth part mirrors has at least one of a different SCS, a different CP length, a different OFDM symbol duration, a different total symbol duration, or a different number of symbols per slot from the configured bandwidth part.

In a second aspect, alone or in combination with the first aspect, each of the one or more bandwidth part mirrors has one or more radio resource control parameters, associated with at least one of SCS, CP length, OFDM symbol duration, total symbol duration, or number of symbols per slot, that are different from corresponding radio resource control parameters of the configured bandwidth part.

In a third aspect, alone or in combination with one or more of the first and second aspects, transmitting the indication to switch from the configured bandwidth part to a bandwidth part mirror associated with the configured bandwidth part comprises transmitting the indication to switch from the configured bandwidth part to a bandwidth part mirror associated with the configured bandwidth via an RRC message, a MAC-CE, or DCI.

In a fourth aspect, alone or in combination with one or more of the first through third aspects, process 1000 includes transmitting, to the UE, an indication to switch back from the bandwidth part mirror associated with the configured bandwidth part to the configured bandwidth part.

In a fifth aspect, alone or in combination with one or more of the first through fourth aspects, the configuration information indicates a first numerology for downlink communications and a second numerology for uplink communications.

In a sixth aspect, alone or in combination with one or more of the first through fifth aspects, the configuration information indicates a duration of the time gap to be applied by the UE between downlink communications using the first numerology and uplink communications using the second numerology.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
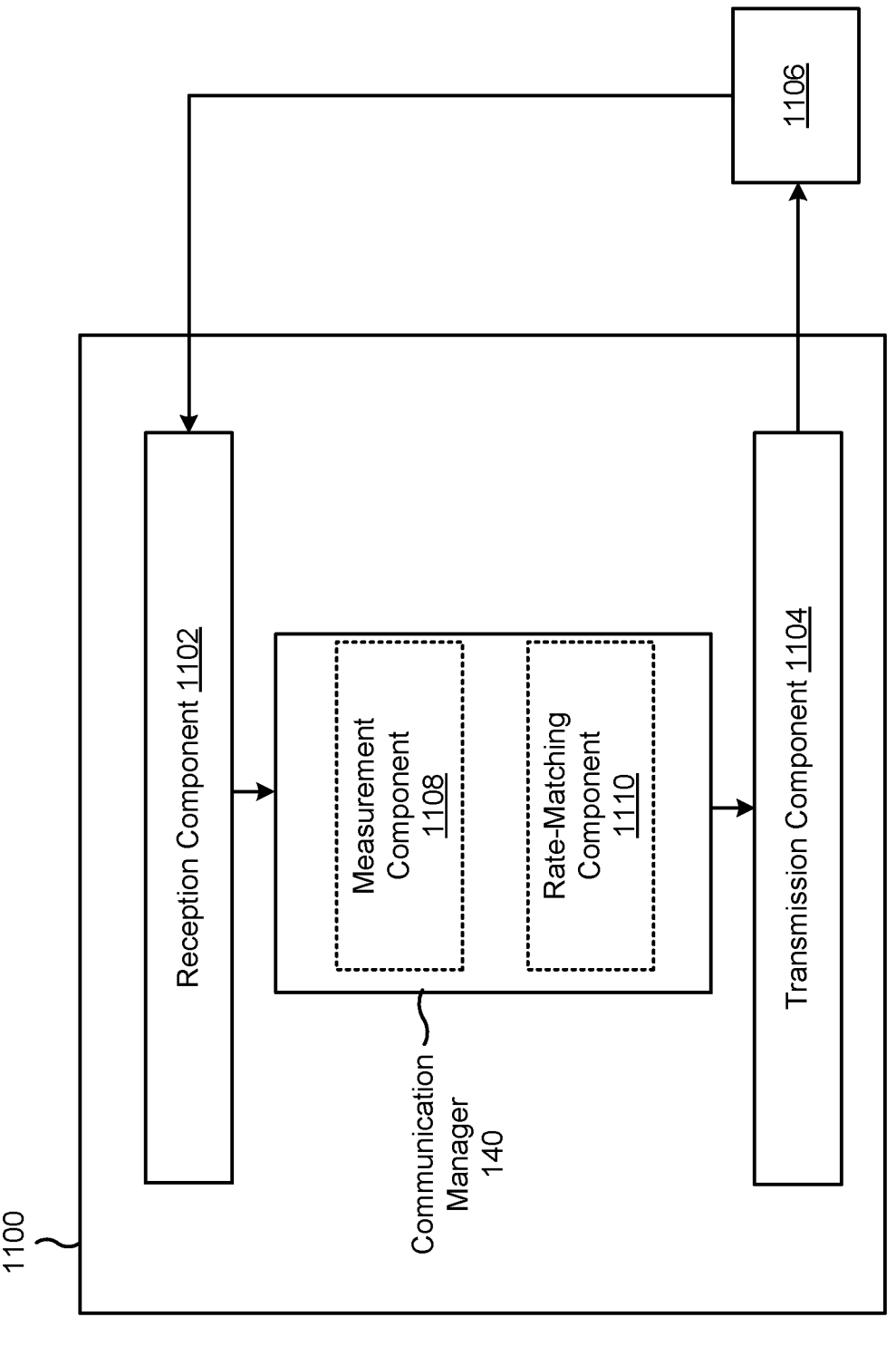
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a measurement component 1108 or a rate-matching component 1110, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station, a CSI report configuration including configuration information that identifies a channel measurement resource associated with a first numerology and configuration information that identifies an interference measurement resource associated with a second numerology that is different from the first numerology. The measurement component 1108 may perform a channel measurement on the channel measurement resource associated with the first numerology and an interference measurement on the interference measurement resource associated with the second numerology. The transmission component 1104 may transmit, to the base station, a CSI report based at least in part on the channel measurement and the interference measurement.

The reception component 1102 may receive, from the base station, configuration information that identifies a plurality of bandwidth parts including the current bandwidth part and one or more other bandwidth parts and identifies, for each bandwidth part of the plurality of bandwidth parts, one or more bandwidth mirrors associated with that bandwidth part.

The reception component 1102 may receive time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

The reception component 1102 may receive an update to the time-domain drifting information associated with the interference measurement resource via at least one of an RRC message, a MAC-CE, or DCI.

The transmission component 1104 may transmit, to the base station, a UE capability report indicating a capability of the UE for jointly monitoring different numerologies for interference measurement resources and channel measurement resources.

The reception component 1102 may receive, from a base station, configuration information indicating a configured bandwidth part for communicating with the base station and one or more bandwidth part mirrors associated with the configured bandwidth part, wherein the one or more bandwidth part mirrors correspond to a same bandwidth part as the configured bandwidth part and different numerologies from a numerology associated with the configured bandwidth part. The reception component 1102 may receive, from the base station, an indication to switch from the configured bandwidth part to a bandwidth part mirror associated with the configured bandwidth part. The reception component 1102 and/or the transmission component 1104 may communicate with the base station using the bandwidth part mirror associated with the configured bandwidth part.

The reception component 1102 may receive, from the base station, an indication to switch back from the bandwidth part mirror associated with the configured bandwidth part to the configured bandwidth part.

The rate-matching component 1110 may perform rate-matching around signals associated with a different numerology from a numerology associated with a current active bandwidth part.

The rate-matching component 1110 may perform rate-matching around symbols in the current active bandwidth part that are partially affected by the signals associated with the different numerology.

The rate-matching component 1110 may forgo performance of rate-matching around symbols in the current active bandwidth that are partially affected by the signals associated with the different numerology based at least in part on a determination that symbols that are partially affected are within a cyclic prefix duration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
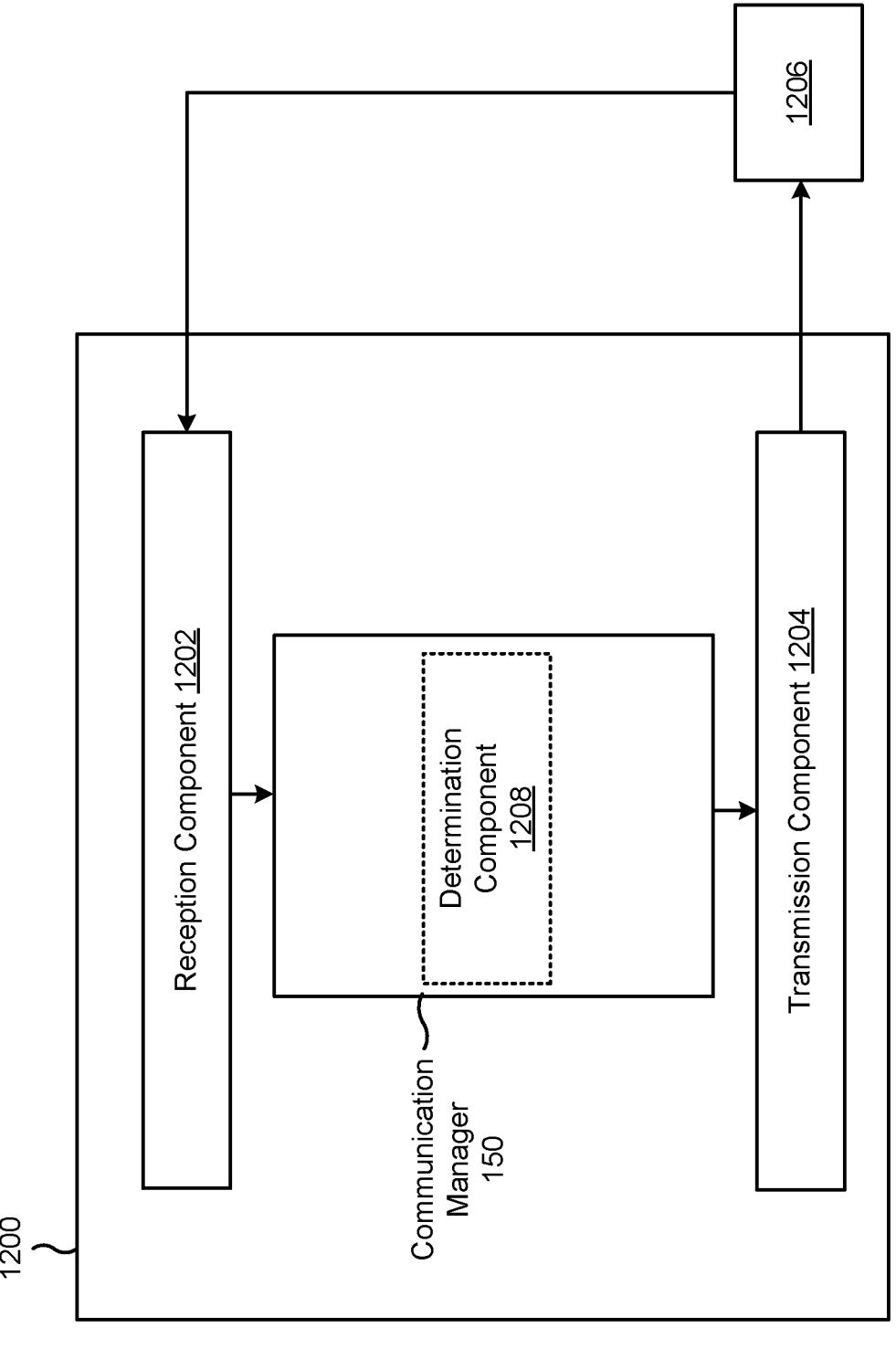

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to a UE, a CSI report configuration including configuration information that identifies a channel measurement resource associated with a first numerology and configuration information that identifies an interference measurement resource associated with a second numerology that is different from the first numerology. The determination component 1208 may determine the channel measurement resource associated with the first numerology and the interference measurement resource associated with the second numerology. The reception component 1202 may receive, from the UE, a CSI report based at least in part on a channel measurement on a channel measurement resource associated with the first numerology and an interference measurement on the interference measurement resource associated with the second numerology.

The transmission component 1204 may transmit, to the UE, configuration information that identifies a plurality of bandwidth parts including the current bandwidth part and one or more other bandwidth parts and identifies, for each bandwidth part of the plurality of bandwidth parts, one or more bandwidth part mirrors associated with that bandwidth part.

The transmission component 1204 may transmit, to the UE, time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

The transmission component 1204 may transmit, to the UE, an update to the time-domain drifting information associated with the interference measurement resource via at least one of an RRC message, a MAC-CE, or DCI.

The reception component 1202 may receive, from the UE, a UE capability report indicating a capability of the UE for jointly monitoring different numerologies for interference measurement resources and channel measurement resources.

The transmission component 1204 may transmit a downlink communication to the UE based at least in part on the CSI report.

The transmission component 1204 may transmit, to a UE, configuration information indicating a configured bandwidth part and one or more bandwidth part mirrors associated with the configured bandwidth part, wherein the one or more bandwidth part mirrors correspond to a same bandwidth part as the configured bandwidth part and different numerologies from a numerology associated with the configured bandwidth part. The transmission component 1204 may transmit, to the UE, an indication to switch from the configured bandwidth part to a bandwidth part mirror associated with the configured bandwidth part. The reception component 1202 and/or the transmission component 1204 may communicate with the UE using the bandwidth part mirror associated with the configured bandwidth part.

The transmission component 1204 may transmit, to the UE, an indication to switch back from the bandwidth part mirror associated with the configured bandwidth part to the configured bandwidth part.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a channel state information (CSI) report configuration including configuration information that identifies a channel measurement resource associated with a first numerology and configuration information that identifies an interference measurement resource associated with a second numerology that is different from the first numerology; performing a channel measurement on the channel measurement resource associated with the first numerology and an interference measurement on the interference measurement resource associated with the second numerology; and transmitting, to the base station, a CSI report based at least in part on the channel measurement and the interference measurement.

Aspect 2: The method of Aspect 1, wherein the configuration information that identifies the interference measurement resource associated with the second numerology includes numerology information that identifies the second numerology associated with the interference measuring resource.

Aspect 3: The method of Aspect 2, wherein the numerology information indicates at least one of a subcarrier spacing, a cyclic prefix length, an orthogonal frequency division multiplexing symbol duration, a total symbol duration, or a number of symbols per slot for the second numerology.

Aspect 4: The method of Aspect 1, wherein the configuration information that identifies the interference measurement resource associated with the second numerology includes an indication that links the interference measurement resource with a bandwidth part mirror associated with a current bandwidth part, wherein the bandwidth part mirror is configured to have a same bandwidth part as the current bandwidth part and a different numerology from a numerology associated with the current bandwidth part.

Aspect 5: The method of Aspect 4, wherein the current bandwidth part has the first numerology and the bandwidth part mirror has the second numerology.

Aspect 6: The method of any of Aspects 4-5, further comprising: receiving, from the base station, configuration information that identifies a plurality of bandwidth parts including the current bandwidth part and one or more other bandwidth parts and identifies, for each bandwidth part of the plurality of bandwidth parts, one or more bandwidth mirrors associated with that bandwidth part.

Aspect 7: The method of any of Aspects 1-6, wherein the second numerology has at least one of a different subcarrier spacing, a different cyclic prefix length, a different orthogonal frequency division multiplexing symbol duration, a different total symbol duration, or a different number of symbols per slot from the first numerology.

Aspect 8: The method of any of Aspects 1-7, wherein the interference measurement resource is a periodic interference measurement resource.

Aspect 9: The method of Aspect 8, further comprising: receiving time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

Aspect 10: The method of Aspect 9, wherein the time-domain drifting information associated with the interference measurement resource is included in the configuration information that identifies the interference measurement resource.

Aspect 11: The method of Aspect 9, wherein the CSI report configuration indicates one or more time-domain drifting information configurations, each associated with a respective time-domain drifting information identifier, and wherein the time-domain drifting information associated with the interference measurement resource is indicated in a first time-domain information configuration of the one or more time-domain drifting information configurations.

Aspect 12: The method of Aspect 11, wherein each of the one or more time-domain drifting information configurations is associated with a respective other UE.

Aspect 13: The method of any of Aspects 11-12, wherein the configuration information that identifies the interference measurement resource indicates the time-domain drifting information identifier associated with the first time-domain information configuration.

Aspect 14: The method of any of Aspects 9-13, further comprising: receiving an update to the time-domain drifting information associated with the interference measurement resource via at least one of a radio resource control message, a medium access control (MAC) control element, or downlink control information.

Aspect 15: The method of any of Aspects 1-14, further comprising: transmitting, to the base station, a UE capability report indicating a capability of the UE for jointly monitoring different numerologies for interference measurement resources and channel measurement resources.

Aspect 16: The method of any of Aspects 1-15, wherein the interference measurement on the interference measurement resource associated with the second numerology is a measurement of interference from another UE.

Aspect 17: A method of wireless communication performed by a base station, comprising: transmitting, to a user equipment (UE), a channel state information (CSI) report configuration including configuration information that identifies a channel measurement resource associated with a first numerology and configuration information that identifies an interference measurement resource associated with a second numerology that is different from the first numerology; and receiving, from the UE, a CSI report based at least in part on a channel measurement on a channel measurement resource associated with the first numerology and an interference measurement on the interference measurement resource associated with the second numerology.

Aspect 18: The method of Aspect 17, wherein the configuration information that identifies the interference measurement resource associated with the second numerology includes numerology information that identifies the second numerology associated with the interference measuring resource.

Aspect 19: The method of Aspect 18, wherein the numerology information indicates at least one of a subcarrier spacing, a cyclic prefix length, an orthogonal frequency division multiplexing symbol duration, a total symbol duration, or a number of symbols per slot for the second numerology.

Aspect 20: The method of Aspect 17, wherein the configuration information that identifies the interference measurement resource associated with the second numerology includes an indication that links the interference measurement resource with a bandwidth part mirror associated with a current bandwidth part, wherein the bandwidth part mirror is configured to have a same bandwidth part as the current bandwidth part and a different numerology from a numerology associated with the current bandwidth part.

Aspect 21: The method of Aspect 20, wherein the current bandwidth part has the first numerology and the bandwidth part mirror has the second numerology.

Aspect 22: The method of any of Aspects 20-21, further comprising: transmitting, to the UE, configuration information that identifies a plurality of bandwidth parts including the current bandwidth part and one or more other bandwidth parts and identifies, for each bandwidth part of the plurality of bandwidth parts, one or more bandwidth part mirrors associated with that bandwidth part.

Aspect 23: The method of any of Aspects 17-22, wherein the second numerology has at least one of a different subcarrier spacing, a different cyclic prefix length, a different orthogonal frequency division multiplexing symbol duration, a different total symbol duration, or a different number of symbols per slot from the first numerology.

Aspect 24: The method of any of Aspects 17-23, wherein the interference measurement resource is a periodic interference measurement resource.

Aspect 25: The method of Aspect 24, further comprising: transmitting, to the UE, time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

Aspect 26: The method of Aspect 25, wherein the time-domain drifting information associated with the interference measurement resource is included in the configuration information that identifies the interference measurement resource.

Aspect 27: The method of Aspect 25, wherein the CSI report configuration indicates one or more time-domain drifting information configurations, each associated with a respective time-domain drifting information identifier, and wherein the time-domain drifting information associated with the interference measurement resource is indicated in a first time-domain information configuration of the one or more time-domain drifting information configurations.

Aspect 28: The method of Aspect 27, wherein each of the one or more time-domain drifting information configurations is associated with a respective other UE.

Aspect 29: The method of any of Aspects 27-28, wherein the configuration information that identifies the interference measurement resource indicates the time-domain drifting information identifier associated with the first time-domain information configuration.

Aspect 30: The method of any of Aspects 25-29, further comprising: transmitting, to the UE, an update to the time-domain drifting information associated with the interference measurement resource via at least one of a radio resource control message, a medium access control (MAC) control element, or downlink control information.

Aspect 31: The method of any of Aspects 17-30, further comprising: receiving, from the UE, a UE capability report indicating a capability of the UE for jointly monitoring different numerologies for interference measurement resources and channel measurement resources.

Aspect 32: The method of any of Aspects 17-31, further comprising: transmitting a downlink communication to the UE based at least in part on the CSI report.

Aspect 33: A method of wireless communication performed by a user equipment (UE), comprising: receiving, from a base station, configuration information indicating a configured bandwidth part for communicating with the base station and one or more bandwidth part mirrors associated with the configured bandwidth part, wherein the one or more bandwidth part mirrors correspond to a same bandwidth part as the configured bandwidth part and different numerologies from a numerology associated with the configured bandwidth part; receiving, from the base station, an indication to switch from the configured bandwidth part to a bandwidth part mirror associated with the configured bandwidth part; and communicating with the base station using the bandwidth part mirror associated with the configured bandwidth part.

Aspect 34: The method of Aspect 33, wherein each of the one or more bandwidth part mirrors has at least one of a different subcarrier spacing, a different cyclic prefix length, a different orthogonal frequency division multiplexing (OFDM) symbol duration, a different total symbol duration, or a different number of symbols per slot from the configured bandwidth part.

Aspect 35: The method of any of Aspects 33-34, wherein each of the one or more bandwidth part mirrors has one or more radio resource control parameters, associated with at least one of subcarrier spacing, cyclic prefix length, orthogonal frequency division multiplexing (OFDM) symbol duration, total symbol duration, or number of symbols per slot, that are different from corresponding radio resource control parameters of the configured bandwidth part.

Aspect 36: The method of any of Aspects 33-35, wherein receiving the indication to switch from the configured bandwidth part to a bandwidth part mirror associated with the configured bandwidth part comprises: receiving the indication to switch from the configured bandwidth part to a bandwidth part mirror associated with the configured bandwidth via a radio resource control message, a medium access control (MAC) control element, or downlink control information.

Aspect 37: The method of any of Aspects 33-36, further comprising: receiving, from the base station, an indication to switch back from the bandwidth part mirror associated with the configured bandwidth part to the configured bandwidth part.

Aspect 38: The method of any of Aspects 33-37, wherein the configuration information indicates a first numerology for downlink communications and a second numerology for uplink communications, and wherein the method further comprises: applying a time gap between downlink communications using the first numerology and uplink communications using the second numerology.

Aspect 39: The method of Aspect 38, wherein the configuration information indicates a duration of the time gap.

Aspect 40: The method of any of Aspects 33-39, further comprising: performing rate-matching around signals associated with a different numerology from a numerology associated with a current active bandwidth part.

Aspect 41: The method of Aspect 40, wherein the rate-matching around the signals associated with the different numerology is based at least in part on configured radio resource control parameters associated with the different numerology.

Aspect 42: The method of Aspect 40, wherein the rate-matching around the signals associated with the different numerology is based at least in part on the indication of the bandwidth part mirror.

Aspect 43: The method of any of Aspects 40-42, further comprising: performing rate-matching around symbols in the current active bandwidth part that are partially affected by the signals associated with the different numerology.

Aspect 44: The method of any of Aspects 40-42, further comprising: forgoing performance of rate-matching around symbols in the current active bandwidth that are partially affected by the signals associated with the different numerology based at least in part on a determination that symbols that are partially affected are within a cyclic prefix duration.

Aspect 45: A method of wireless communication performed by a base station, comprising: transmitting, to a user equipment (UE), configuration information indicating a configured bandwidth part and one or more bandwidth part mirrors associated with the configured bandwidth part, wherein the one or more bandwidth part mirrors correspond to a same bandwidth part as the configured bandwidth part and different numerologies from a numerology associated with the configured bandwidth part; transmitting, to the UE, an indication to switch from the configured bandwidth part to a bandwidth part mirror associated with the configured bandwidth part; and communicating with the UE using the bandwidth part mirror associated with the configured bandwidth part.

Aspect 46: The method of Aspect 45, wherein each of the one or more bandwidth part mirrors has at least one of a different subcarrier spacing, a different cyclic prefix length, a different orthogonal frequency division multiplexing (OFDM) symbol duration, a different total symbol duration, or a different number of symbols per slot from the configured bandwidth part.

Aspect 47: The method of any of Aspects 45-46, wherein each of the one or more bandwidth part mirrors has one or more radio resource control parameters, associated with at least one of subcarrier spacing, cyclic prefix length, orthogonal frequency division multiplexing (OFDM) symbol duration, total symbol duration, or number of symbols per slot, that are different from corresponding radio resource control parameters of the configured bandwidth part.

Aspect 48: The method of any of Aspects 45-47, wherein transmitting the indication to switch from the configured bandwidth part to a bandwidth part mirror associated with the configured bandwidth part comprises: transmitting the indication to switch from the configured bandwidth part to a bandwidth part mirror associated with the configured bandwidth via a radio resource control message, a medium access control (MAC) control element, or downlink control information.

Aspect 49: The method of any of Aspects 45-48, further comprising: transmitting, to the UE, an indication to switch back from the bandwidth part mirror associated with the configured bandwidth part to the configured bandwidth part.

Aspect 50: The method of any of Aspects 45-49, wherein the configuration information indicates a first numerology for downlink communications and a second numerology for uplink communications.

Aspect 51: The method of Aspect 50, wherein the configuration information indicates a duration of the time gap to be applied by the UE between downlink communications using the first numerology and uplink communications using the second numerology.

Aspect 52: An apparatus for wireless communication at a device, comprising a processor; memory coupled with the processor; and instructions stored in the memory and executable by the processor to cause the apparatus to perform the method of one or more of Aspects 1-16.

Aspect 53: An apparatus for wireless communication at a device, comprising a processor; memory coupled with the processor; and instructions stored in the memory and executable by the processor to cause the apparatus to perform the method of one or more of Aspects 17-32.

Aspect 54: An apparatus for wireless communication at a device, comprising a processor; memory coupled with the processor; and instructions stored in the memory and executable by the processor to cause the apparatus to perform the method of one or more of Aspects 33-44.

Aspect 55: An apparatus for wireless communication at a device, comprising a processor; memory coupled with the processor; and instructions stored in the memory and executable by the processor to cause the apparatus to perform the method of one or more of Aspects 45-51.

Aspect 56: A device for wireless communication, comprising a memory and one or more processors coupled to the memory, the one or more processors configured to perform the method of one or more of Aspects 1-16.

Aspect 57: A device for wireless communication, comprising a memory and one or more processors coupled to the memory, the one or more processors configured to perform the method of one or more of Aspects 17-32.

Aspect 58: A device for wireless communication, comprising a memory and one or more processors coupled to the memory, the one or more processors configured to perform the method of one or more of Aspects 33-44.

Aspect 59: A device for wireless communication, comprising a memory and one or more processors coupled to the memory, the one or more processors configured to perform the method of one or more of Aspects 45-51.

Aspect 60: An apparatus for wireless communication, comprising at least one means for performing the method of one or more of Aspects 1-16.

Aspect 61: An apparatus for wireless communication, comprising at least one means for performing the method of one or more of Aspects 17-32.

Aspect 62: An apparatus for wireless communication, comprising at least one means for performing the method of one or more of Aspects 33-44.

Aspect 63: An apparatus for wireless communication, comprising at least one means for performing the method of one or more of Aspects 45-51.

Aspect 64: A non-transitory computer-readable medium storing code for wireless communication, the code comprising instructions executable by a processor to perform the method of one or more of Aspects 1-16.

Aspect 65: A non-transitory computer-readable medium storing code for wireless communication, the code comprising instructions executable by a processor to perform the method of one or more of Aspects 17-32.

Aspect 66: A non-transitory computer-readable medium storing code for wireless communication, the code comprising instructions executable by a processor to perform the method of one or more of Aspects 33-44.

Aspect 67: A non-transitory computer-readable medium storing code for wireless communication, the code comprising instructions executable by a processor to perform the method of one or more of Aspects 45-51.

Aspect 68: A non-transitory computer-readable medium storing a set of instructions for wireless communication, the set of instructions comprising one or more instructions that, when executed by one or more processors of a device, cause the device to perform the method of one or more of Aspects 1-16.

Aspect 69: A non-transitory computer-readable medium storing a set of instructions for wireless communication, the set of instructions comprising one or more instructions that, when executed by one or more processors of a device, cause the device to perform the method of one or more of Aspects 17-32.

Aspect 70: A non-transitory computer-readable medium storing a set of instructions for wireless communication, the set of instructions comprising one or more instructions that, when executed by one or more processors of a device, cause the device to perform the method of one or more of Aspects 33-44.

Aspect 71: A non-transitory computer-readable medium storing a set of instructions for wireless communication, the set of instructions comprising one or more instructions that, when executed by one or more processors of a device, cause the device to perform the method of one or more of Aspects 45-51.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:

at least one transceiver;

at least one memory comprising instructions; and one or more processors configured to execute the instructions to cause the UE to:

receive, from a base station via the at least one transceiver, a channel state information (CSI) report configuration including configuration information that identifies a channel measurement resource associated with a first numerology and configuration information that identifies an interference measurement resource associated with a second numerology that is different from the first numerology, wherein at least one of:

the configuration information that identifies the interference measurement resource associated with the second numerology includes an indication that links the interference measurement resource with a bandwidth part mirror associated with a current bandwidth part, or the bandwidth part mirror is configured to have a same bandwidth part as the current bandwidth part and a different numerology from a numerology associated with the current bandwidth part;

perform a channel measurement on the channel measurement resource associated with the first numerology and an interference measurement on the interference measurement resource associated with the second numerology; and transmit, to the base station via the at least one transceiver, a CSI report based at least in part on the channel measurement and the interference measurement.

2. The UE of claim 1, wherein the configuration information that identifies the interference measurement resource associated with the second numerology includes numerology information that identifies the second numerology associated with the interference measuring resource.

3. The UE of claim 2, wherein the numerology information indicates at least one of a subcarrier spacing, a cyclic prefix length, an orthogonal frequency division multiplexing symbol duration, a total symbol duration, or a number of symbols per slot for the second numerology.

4. The UE of claim 1, wherein the current bandwidth part has the first numerology and the bandwidth part mirror has the second numerology.

5. The UE of claim 1, wherein the one or more processors are further configured to:

receive, from the base station via the at least one transceiver, configuration information that identifies a plurality of bandwidth parts including the current bandwidth part and one or more other bandwidth parts and identifies, for each bandwidth part of the plurality of bandwidth parts, one or more bandwidth mirrors associated with that bandwidth part.

6. The UE of claim 1, wherein the second numerology has at least one of a different subcarrier spacing, a different cyclic prefix length, a different orthogonal frequency division multiplexing symbol duration, a different total symbol duration, or a different number of symbols per slot from the first numerology.

7. The UE of claim 1, wherein the interference measurement resource is a periodic interference measurement resource.

8. The UE of claim 1, wherein the one or more processors are further configured to:

receive, via the at least one transceiver, time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

9. The UE of claim 8, wherein the time-domain drifting information associated with the interference measurement resource is included in the configuration information that identifies the interference measurement resource.

10. The UE of claim 8, wherein the CSI report configuration indicates one or more time-domain drifting information configurations, each associated with a respective time-domain drifting information identifier, and wherein the time-domain drifting information associated with the interference measurement resource is indicated in a first time-domain information configuration of the one or more time-domain drifting information configurations.

11. The UE of claim 10, wherein each of the one or more time-domain drifting information configurations is associated with a respective other UE.

12. The UE of claim 10, wherein the configuration information that identifies the interference measurement resource indicates the time-domain drifting information identifier associated with the first time-domain information configuration.

13. The UE of claim 8, wherein the one or more processors are further configured to:

receive, via the at least one transceiver, an update to the time-domain drifting information associated with the interference measurement resource via at least one of a radio resource control message, a medium access control (MAC) control element, or downlink control information.

14. The UE of claim 1, wherein the one or more processors are further configured to:

transmit, to the base station via the at least one transceiver, a UE capability report indicating a capability of the UE for jointly monitoring different numerologies for interference measurement resources and channel measurement resources.

15. The UE of claim 1, wherein the interference measurement on the interference measurement resource associated with the second numerology is a measurement of interference from another UE.

16. A base station, comprising:

at least one transceiver;

at least one memory comprising instructions; and one or more processors configured to execute the instructions to cause the base station to:

transmit, to a user equipment (UE) via the at least one transceiver, a channel state information (CSI) report configuration including configuration information that identifies a channel measurement resource associated with a first numerology and configuration information that identifies an interference measurement resource associated with a second numerology that is different from the first numerology, wherein at least one of:

the configuration information that identifies the interference measurement resource associated with the second numerology includes an indication that links the interference measurement resource with a bandwidth part mirror associated with a current bandwidth part, the bandwidth part mirror is configured to have a same bandwidth part as the current bandwidth part and a different numerology from a numerology associated with the current bandwidth part, or the current bandwidth part has the first numerology and the bandwidth part mirror has the second numerology; and receive, from the UE via the at least one transceiver, a CSI report based at least in part on a channel measurement on a channel measurement resource associated with the first numerology and an interference measurement on the interference measurement resource associated with the second numerology.

17. The base station of claim 16, wherein the configuration information that identifies the interference measurement resource associated with the second numerology includes numerology information that identifies the second numerology associated with the interference measuring resource, and wherein the numerology information indicates at least one of a subcarrier spacing, a cyclic prefix length, an orthogonal frequency division multiplexing symbol duration, a total symbol duration, or a number of symbols per slot for the second numerology.

18. The base station of claim 16, wherein the interference measurement resource is a periodic interference measurement resource, and wherein the one or more processors are further configured to:

transmit, to the UE via the at least one transceiver, time-domain drifting information associated with the interference measurement resource, wherein the time-domain drifting information includes a time-domain offset associated with a starting slot of the interference measurement resource and time-domain drifting rate information that indicates an update to the time-domain offset after a number of slots or symbols.

19. The base station of claim 16, wherein the one or more processors are further configured to:

receive, from the UE via the at least one transceiver, a UE capability report indicating a capability of the UE for jointly monitoring different numerologies for interference measurement resources and channel measurement resources.

20. The base station of claim 16, wherein the one or more processors are further configured to:

transmit, via the at least one transceiver, a downlink communication to the UE based at least in part on the CSI report.

21. A user equipment (UE), comprising:

at least one transceiver;

at least one memory comprising instructions; and one or more processors configured to execute the instructions to cause the UE to:

receive, from a base station via the at least one transceiver, a channel state information (CSI) report configuration including configuration information that identifies a channel measurement resource associated with a first numerology and configuration information that identifies an interference measurement resource associated with a second numerology that is different from the first numerology;

perform a channel measurement on the channel measurement resource associated with the first numerology and an interference measurement on the interference measurement resource associated with the second numerology; and transmit, to the base station via the at least one transceiver, a CSI report based at least in part on the channel measurement and the interference measurement, wherein at least one of:

the one or more processors are further configured to cause the UE to receive, via the at least one transceiver, time-domain drifting information associated with the interference measurement resource, or the time-domain drifting information includes a time-domain offset associated with a starting slot of the interference measurement resource and time-domain drifting rate information that indicates an update to the time-domain offset after a number of slots or symbols.

22. The UE of claim 21, wherein the time-domain drifting information associated with the interference measurement resource is included in the configuration information that identifies the interference measurement resource.

23. The UE of claim 21, wherein the CSI report configuration indicates one or more time-domain drifting information configurations, each associated with a respective time-domain drifting information identifier, and wherein the time-domain drifting information associated with the interference measurement resource is indicated in a first time-domain information configuration of the one or more time-domain drifting information configurations.

24. The UE of claim 23, wherein each of the one or more time-domain drifting information configurations is associated with a respective other UE.

25. The UE of claim 23, wherein the configuration information that identifies the interference measurement resource indicates the time-domain drifting information identifier associated with the first time-domain information configuration.

26. The UE of claim 21, wherein the one or more processors are further configured to:

receive an update to the time-domain drifting information associated with the interference measurement resource via at least one of a radio resource control message, a medium access control (MAC) control element, or downlink control information.

27. A base station, comprising:

at least one transceiver;

at least one memory comprising instructions; and one or more processors configured to execute the instructions to cause the base station to:

transmit, to a user equipment (UE) via the at least one transceiver, a channel state information (CSI) report configuration including configuration information that identifies a channel measurement resource associated with a first numerology and configuration information that identifies an interference measurement resource associated with a second numerology that is different from the first numerology;

receive, from the UE via the at least one transceiver, a CSI report based at least in part on a channel measurement on a channel measurement resource associated with the first numerology and an interference measurement on the interference measurement resource associated with the second numerology, wherein at least one of:

the one or more processors are further configured to cause the base station to transmit, to the UE via the at least one transceiver, time-domain drifting information associated with the interference measurement resource, or the time-domain drifting information includes a time-domain offset associated with a starting slot of the interference measurement resource and time-domain drifting rate information that indicates an update to the time-domain offset after a number of slots or symbols.

28. The base station of claim 27, wherein the time-domain drifting information associated with the interference measurement resource is included in the configuration information that identifies the interference measurement resource.

29. The base station of claim 27, wherein the CSI report configuration indicates one or more time-domain drifting information configurations, each associated with a respective time- domain drifting information identifier, and wherein the time-domain drifting information associated with the interference measurement resource is indicated in a first time-domain information configuration of the one or more time-domain drifting information configurations.

30. The base station of claim 27, wherein the one or more processors are further configured to:

transmit an update to the time-domain drifting information associated with the interference measurement resource via at least one of a radio resource control message, a medium access control (MAC) control element, or control information.

\* \* \* \* \*